US007783614B2

(12) United States Patent
Jones et al.

(10) Patent No.: US 7,783,614 B2
(45) Date of Patent: Aug. 24, 2010

(54) LINKING ELEMENTS OF A DOCUMENT TO CORRESPONDING FIELDS, QUERIES AND/OR PROCEDURES IN A DATABASE

(75) Inventors: Brian Jones, Redmond, WA (US); Marcin Sawicki, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 96 days.

(21) Appl. No.: 10/366,141

(22) Filed: Feb. 13, 2003

(65) Prior Publication Data

US 2004/0162833 A1    Aug. 19, 2004

(51) Int. Cl.
    G06F 17/00    (2006.01)
(52) U.S. Cl. .................................. 707/694; 717/617
(58) Field of Classification Search ............... 707/1–10, 707/100–104.1, 200–205
    See application file for complete search history.

(56) References Cited

U.S. PATENT DOCUMENTS

| 4,674,065 | A | 6/1987 | Lange et al. ................. 382/311 |
| 4,868,750 | A | 9/1989 | Kucera et al. ................... 711/2 |
| 5,020,019 | A | 5/1991 | Ogawa ........................... 707/5 |
| 5,128,865 | A | 7/1992 | Sadler ............................ 704/2 |
| 5,159,552 | A | 10/1992 | van Gasteren et al. .......... 704/1 |
| 5,267,155 | A | 11/1993 | Buchanan et al. ............ 715/540 |
| 5,287,448 | A | 2/1994 | Nicol et al. .................. 715/707 |
| 5,297,039 | A | 3/1994 | Kanaegami et al. ............. 707/5 |
| 5,317,546 | A | 5/1994 | Balch et al. ..................... 368/9 |
| 5,337,233 | A | 8/1994 | Hofert et al. ................. 715/540 |
| 5,341,293 | A | 8/1994 | Vertelney et al. ............. 715/530 |
| 5,351,190 | A | 9/1994 | Kondo ............................ 704/8 |
| 5,386,564 | A | 1/1995 | Shearer et al. ............... 395/650 |
| 5,392,386 | A | 2/1995 | Chalas ........................ 715/841 |
| 5,418,902 | A | 5/1995 | West et al. ................... 715/503 |
| 5,446,891 | A | 8/1995 | Kaplan et al. ................ 395/600 |
| 5,522,089 | A | 5/1996 | Kikinis et al. ................. 710/73 |
| 5,535,323 | A | 7/1996 | Miller et al. ................. 715/707 |

(Continued)

FOREIGN PATENT DOCUMENTS

CA    2 246 920 A1    3/2000

(Continued)

OTHER PUBLICATIONS

Brooks-Bilson, Rob, Programming ColdFusion [electronic resource] 2001, Safari Tech Books Online, 1$^{st}$ edition.*

(Continued)

Primary Examiner—Khanh B Pham
Assistant Examiner—Leon Harper
(74) Attorney, Agent, or Firm—Merchant & Gould

(57) ABSTRACT

Methods and systems are provided for mapping and linking elements in a document to corresponding fields or queries in a database. A document is annotated with structural elements of a markup language, such as Extensible Markup Language (XML), in order to map portions of the document to the corresponding database. Once individual elements within the document are mapped and linked to corresponding data fields or queries within a selected database, changes made to individual elements within the document automatically cause updates to corresponding data in the database to which those elements are mapped and linked. Conversely, changes made to individual data fields within the selected database automatically update corresponding elements within the document.

28 Claims, 7 Drawing Sheets

U.S. PATENT DOCUMENTS

| | | | |
|---|---|---|---|
| 5,541,836 A | 7/1996 | Church et al. ................. 704/7 |
| 5,546,521 A | 8/1996 | Martinez ................... 715/711 |
| 5,581,684 A | 12/1996 | Dudzik et al. .............. 715/708 |
| 5,596,700 A | 1/1997 | Darnell et al. .............. 715/512 |
| 5,617,565 A | 4/1997 | Augenbraun et al. ........ 395/604 |
| 5,625,783 A | 4/1997 | Ezekiel et al. .............. 395/352 |
| 5,627,567 A | 5/1997 | Davidson ................... 345/173 |
| 5,627,958 A | 5/1997 | Potts et al. ................. 715/708 |
| 5,634,019 A | 5/1997 | Koppolu et al. ............. 715/744 |
| 5,640,560 A | 6/1997 | Smith ........................ 395/615 |
| 5,657,259 A | 8/1997 | Davis et al. ................. 708/204 |
| 5,685,000 A | 11/1997 | Cox ............................. 704/9 |
| 5,708,825 A | 1/1998 | Sotomayor ................. 395/762 |
| 5,715,415 A | 2/1998 | Dazey et al. ............... 715/708 |
| 5,717,923 A | 2/1998 | Dedrick ..................... 395/613 |
| 5,752,022 A | 5/1998 | Chiu et al. .................. 395/610 |
| 5,761,689 A | 6/1998 | Rayson et al. .............. 707/533 |
| 5,764,794 A | 6/1998 | Perlin ........................ 382/186 |
| 5,765,156 A | 6/1998 | Guzak et al. ................ 707/100 |
| 5,781,189 A | 7/1998 | Holleran et al. ............. 715/826 |
| 5,781,904 A | 7/1998 | Oren et al. .................. 707/100 |
| 5,794,257 A | 8/1998 | Liu et al. .................... 707/501 |
| 5,799,068 A | 8/1998 | Kikinis et al. ............ 379/93.06 |
| 5,802,253 A | 9/1998 | Gross et al. ................... 395/51 |
| 5,802,262 A | 9/1998 | Van De Vanter ............ 395/180 |
| 5,802,299 A | 9/1998 | Logan et al. ........... 395/200.48 |
| 5,802,530 A | 9/1998 | van Hoff .................... 707/513 |
| 5,805,911 A | 9/1998 | Miller ........................ 395/796 |
| 5,809,318 A | 9/1998 | Rivette et al. ............... 715/512 |
| 5,815,830 A | 9/1998 | Anthony ....................... 707/6 |
| 5,818,447 A | 10/1998 | Wolf et al. .................. 715/752 |
| 5,821,931 A | 10/1998 | Berquist et al. ............. 715/784 |
| 5,822,539 A | 10/1998 | van Hoff ............... 395/200.66 |
| 5,822,720 A | 10/1998 | Bookman et al. .............. 704/3 |
| 5,826,025 A | 10/1998 | Gramlich ............... 395/200.47 |
| 5,832,100 A | 11/1998 | Lawton et al. .............. 382/100 |
| 5,845,077 A | 12/1998 | Fawcett ...................... 709/221 |
| 5,855,007 A | 12/1998 | Jovicic et al. ................ 705/14 |
| 5,859,636 A | 1/1999 | Pandit .................... 715/501.1 |
| 5,872,973 A * | 2/1999 | Mitchell et al. ............. 719/332 |
| 5,875,443 A | 2/1999 | Nielsen ........................ 707/2 |
| 5,877,757 A | 3/1999 | Baldwin et al. .............. 715/705 |
| 5,884,266 A | 3/1999 | Dvorak .................... 704/270.1 |
| 5,892,919 A | 4/1999 | Nielsen ................. 395/200.58 |
| 5,893,073 A | 4/1999 | Kasso et al. .................... 705/8 |
| 5,893,132 A | 4/1999 | Huffman et al. ............. 715/201 |
| 5,895,461 A * | 4/1999 | De La Huerga et al. ......... 707/1 |
| 5,896,321 A | 4/1999 | Miller et al. ............. 365/189.01 |
| 5,900,004 A | 5/1999 | Gipson ....................... 707/530 |
| 5,907,852 A | 5/1999 | Yamada ...................... 715/541 |
| 5,913,214 A | 6/1999 | Madnick et al. .............. 707/10 |
| 5,920,859 A | 7/1999 | Li ................................. 707/5 |
| 5,924,099 A | 7/1999 | Guzak et al. ................ 707/100 |
| 5,933,139 A | 8/1999 | Feigner et al. ............... 715/708 |
| 5,933,140 A | 8/1999 | Strahom et al. ............. 715/712 |
| 5,933,498 A | 8/1999 | Schneck et al. ............... 705/54 |
| 5,940,614 A | 8/1999 | Allen et al. .................. 717/120 |
| 5,944,787 A | 8/1999 | Zoken ........................ 709/206 |
| 5,946,647 A | 8/1999 | Miller et al. .................... 704/9 |
| 5,948,061 A | 9/1999 | Merriman et al. ............ 709/219 |
| 5,956,681 A | 9/1999 | Yamakita .................... 704/260 |
| 5,974,413 A | 10/1999 | Beauregard et al. ............ 707/6 |
| 5,987,480 A | 11/1999 | Donohue et al. ......... 715/501.1 |
| 5,991,719 A | 11/1999 | Yazaki et al. ................ 704/251 |
| 5,995,756 A | 11/1999 | Herrmann ................... 395/712 |
| 6,006,265 A | 12/1999 | Rangan et al. ............... 709/226 |
| 6,006,279 A | 12/1999 | Hayes ........................ 719/328 |
| 6,018,761 A | 1/2000 | Uomini ...................... 706/206 |
| 6,028,605 A | 2/2000 | Conrad et al. ............... 345/840 |
| 6,029,135 A | 2/2000 | Krasle ........................ 704/275 |
| 6,029,171 A | 2/2000 | Smiga et al. ................. 707/102 |
| 6,031,525 A | 2/2000 | Perlin ......................... 345/173 |
| 6,052,531 A | 4/2000 | Waldin et al. ............... 717/170 |
| 6,061,516 A | 5/2000 | Yoshikawa et al. .......... 717/109 |
| 6,067,087 A | 5/2000 | Krauss et al. ............... 715/762 |
| 6,072,475 A | 6/2000 | Van Ketwich ............... 345/173 |
| 6,073,090 A | 6/2000 | Fortune et al. ................. 704/8 |
| 6,085,201 A | 7/2000 | Tso ............................ 715/505 |
| 6,088,711 A | 7/2000 | Fein et al. ................... 715/523 |
| 6,092,074 A | 7/2000 | Rodkin et al. ............... 707/102 |
| 6,108,640 A | 8/2000 | Slotznick ..................... 705/26 |
| 6,108,674 A | 8/2000 | Murakami et al. ........... 715/515 |
| 6,112,209 A * | 8/2000 | Gusack ....................... 707/101 |
| 6,121,968 A | 9/2000 | Arcuri et al. ................. 345/352 |
| 6,122,647 A | 9/2000 | Horowitz et al. ............. 707/513 |
| 6,126,306 A | 10/2000 | Ando ......................... 708/605 |
| 6,137,911 A | 10/2000 | Zhilyaev ..................... 382/225 |
| 6,141,005 A | 10/2000 | Hetherington et al. ....... 715/866 |
| 6,151,643 A | 11/2000 | Cheng et al. .................. 710/36 |
| 6,154,738 A | 11/2000 | Call ............................... 707/4 |
| 6,167,469 A | 12/2000 | Safai et al. .................... 710/62 |
| 6,167,523 A | 12/2000 | Strong .......................... 726/21 |
| 6,167,568 A | 12/2000 | Gandel et al. ............... 717/176 |
| 6,173,316 B1 | 1/2001 | DeBoor et al. .............. 709/218 |
| 6,182,029 B1 | 1/2001 | Friedman ...................... 704/9 |
| 6,185,550 B1 | 2/2001 | Snow et al. .................... 707/1 |
| 6,185,576 B1 | 2/2001 | McIntosh ................... 707/200 |
| 6,199,046 B1 | 3/2001 | Heinzle et al. .................. 705/1 |
| 6,199,081 B1 | 3/2001 | Meyerzon et al. ............ 715/513 |
| 6,208,338 B1 | 3/2001 | Fischer et al. ............... 715/705 |
| 6,219,698 B1 | 4/2001 | Iannucci et al. .............. 709/221 |
| 6,246,404 B1 | 6/2001 | Feigner et al. ............... 715/708 |
| 6,262,728 B1 | 7/2001 | Alexander ................ 345/440.1 |
| 6,272,074 B1 | 8/2001 | Winner ........................ 368/10 |
| 6,272,505 B1 | 8/2001 | De La Huerga ............. 707/501 |
| 6,282,489 B1 | 8/2001 | Bellesfield et al. .......... 701/201 |
| 6,291,785 B1 | 9/2001 | Koga et al. .................. 209/584 |
| 6,292,768 B1 | 9/2001 | Chan ............................ 704/1 |
| 6,295,061 B1 | 9/2001 | Park et al. ................... 715/764 |
| 6,297,822 B1 | 10/2001 | Feldman ..................... 715/705 |
| 6,300,950 B1 | 10/2001 | Clark et al. .................. 715/705 |
| 6,308,171 B1 * | 10/2001 | De La Huerga ............... 707/3 |
| 6,311,152 B1 | 10/2001 | Bai et al. ....................... 704/9 |
| 6,311,177 B1 | 10/2001 | Dauerer et al. ................. 707/2 |
| 6,311,194 B1 | 10/2001 | Sheth et al. .................. 715/505 |
| 6,320,496 B1 | 11/2001 | Sokoler et al. ............. 340/470.1 |
| 6,323,853 B1 | 11/2001 | Hedloy ....................... 345/339 |
| 6,336,125 B2 | 1/2002 | Noda et al. .................. 715/531 |
| 6,336,131 B1 | 1/2002 | Wolfe et al. ................. 709/203 |
| 6,338,059 B1 | 1/2002 | Fields et al. .................... 707/4 |
| 6,339,436 B1 | 1/2002 | Amro et al. ................. 715/714 |
| 6,339,755 B1 | 1/2002 | Hetherington et al. .......... 704/8 |
| 6,347,398 B1 | 2/2002 | Parthasarathy et al. ....... 717/11 |
| 6,353,926 B1 | 3/2002 | Pathesarathy et al. ....... 717/170 |
| 6,381,742 B2 | 4/2002 | Forbes et al. ................ 717/176 |
| 6,382,350 B1 | 5/2002 | Jezewski et al. ............. 181/290 |
| 6,392,668 B1 | 5/2002 | Murray ........................ 715/38 |
| 6,396,515 B1 | 5/2002 | Hetherington et al. ....... 715/762 |
| 6,401,067 B2 | 6/2002 | Lewis et al. ................. 704/275 |
| 6,408,323 B1 | 6/2002 | Kobayashi et al. ........... 709/100 |
| 6,413,100 B1 | 7/2002 | Dickmeyer et al. .......... 434/322 |
| 6,415,304 B1 | 7/2002 | Horvitz ....................... 715/205 |
| 6,421,678 B2 | 7/2002 | Smiga et al. ................. 707/102 |
| 6,424,979 B1 * | 7/2002 | Livingston et al. .......... 715/511 |
| 6,434,567 B1 | 8/2002 | De La Huerga ............. 707/102 |
| 6,438,545 B1 | 8/2002 | Beauregard et al. ............ 707/6 |
| 6,441,753 B1 | 8/2002 | Montgomery ................ 341/34 |
| 6,442,545 B1 | 8/2002 | Feldman et al. ................ 707/8 |
| 6,442,591 B1 | 8/2002 | Haynes et al. ............... 709/206 |
| 6,456,304 B1 | 9/2002 | Anguilo et al. .............. 715/779 |
| 6,470,091 B2 | 10/2002 | Koga et al. .................. 382/101 |
| 6,473,069 B1 | 10/2002 | Gerpheide ................... 345/157 |
| 6,477,510 B1 | 11/2002 | Johnson ....................... 705/30 |
| 6,480,860 B1 * | 11/2002 | Monday ...................... 707/102 |

| Patent | Kind | Date | Inventor | Class |
|---|---|---|---|---|
| 6,493,006 | B1 | 12/2002 | Gourdol et al. | 345/825 |
| 6,498,982 | B2 | 12/2002 | Bellesfield et al. | 701/202 |
| 6,510,504 | B2 | 1/2003 | Satyanarayanan | 711/170 |
| 6,516,321 | B1* | 2/2003 | De La Huerga | 707/102 |
| 6,519,557 | B1 | 2/2003 | Emens et al. | 704/8 |
| 6,519,603 | B1 | 2/2003 | Bays et al. | 707/102 |
| 6,546,433 | B1 | 4/2003 | Matheson | 709/318 |
| 6,553,385 | B2 | 4/2003 | Johnson et al. | 707/104.1 |
| 6,556,972 | B1 | 4/2003 | Bakis et al. | 704/277 |
| 6,556,984 | B1 | 4/2003 | Zien | 707/2 |
| 6,564,264 | B1 | 5/2003 | Creswell et al. | 709/245 |
| 6,571,241 | B1 | 5/2003 | Nosohara | 707/6 |
| 6,571,253 | B1 | 5/2003 | Thompson et al. | 707/103 R |
| 6,591,260 | B1* | 7/2003 | Schwarzhoff et al. | 707/2 |
| 6,595,342 | B1 | 7/2003 | Maritzen et al. | 194/212 |
| 6,601,075 | B1* | 7/2003 | Huang et al. | 707/104.1 |
| 6,604,099 | B1* | 8/2003 | Chung et al. | 707/3 |
| 6,615,131 | B1 | 9/2003 | Rennard et al. | 701/200 |
| 6,618,733 | B1 | 9/2003 | White et al. | 707/103 |
| 6,622,140 | B1 | 9/2003 | Kantrowitz | 707/5 |
| 6,623,527 | B1 | 9/2003 | Hamzy | 715/513 |
| 6,625,581 | B1 | 9/2003 | Perkowski | 705/27 |
| 6,629,079 | B1 | 9/2003 | Spiegel et al. | 705/26 |
| 6,631,519 | B1* | 10/2003 | Nicholson et al. | 717/169 |
| 6,636,880 | B1 | 10/2003 | Bera | 708/206 |
| 6,643,650 | B1* | 11/2003 | Slaughter et al. | 707/10 |
| 6,654,734 | B1* | 11/2003 | Mani et al. | 707/2 |
| 6,654,932 | B1 | 11/2003 | Bahrs et al. | 715/507 |
| 6,658,623 | B1 | 12/2003 | Schilit et al. | 715/513 |
| 6,687,485 | B2 | 2/2004 | Hopkins et al. | 434/307 |
| 6,694,307 | B2 | 2/2004 | Julien | 707/3 |
| 6,697,824 | B1 | 2/2004 | Bowman-Amuah | 709/229 |
| 6,697,837 | B1 | 2/2004 | Rodov | 709/203 |
| 6,708,189 | B1 | 3/2004 | Fitzsimons et al. | 707/205 |
| 6,715,144 | B2 | 3/2004 | Daynes et al. | 717/174 |
| 6,717,593 | B1 | 4/2004 | Jennings | 715/760 |
| 6,718,516 | B1 | 4/2004 | Claussen et al. | 715/513 |
| 6,728,679 | B1 | 4/2004 | Strubbe et al. | 704/270.1 |
| 6,732,090 | B2 | 5/2004 | Shanahan et al. | 707/3 |
| 6,732,361 | B1 | 5/2004 | Andreoli et al. | 719/313 |
| 6,741,994 | B1 | 5/2004 | Kang et al. | 707/102 |
| 6,742,054 | B1 | 5/2004 | Upton, IV | 710/6 |
| 6,745,208 | B2 | 6/2004 | Berg et al. | 707/201 |
| 6,766,326 | B1* | 7/2004 | Cena | 707/101 |
| 6,795,808 | B1 | 9/2004 | Strubbe et al. | 704/275 |
| 6,802,061 | B1 | 10/2004 | Parthasarathy et al. | 717/173 |
| 6,826,726 | B2 | 11/2004 | Hsing et al. | 715/513 |
| 6,829,631 | B1 | 12/2004 | Forman et al. | 709/202 |
| 6,845,499 | B2 | 1/2005 | Srivastava et al. | 717/100 |
| 6,857,103 | B1 | 2/2005 | Wason | 715/709 |
| 6,859,908 | B1 | 2/2005 | Clapper | 715/224 |
| 6,868,525 | B1 | 3/2005 | Szabo | 715/738 |
| 6,874,125 | B1 | 3/2005 | Carroll et al. | 715/705 |
| 6,874,143 | B1 | 3/2005 | Murray et al. | 717/173 |
| 6,880,129 | B1 | 4/2005 | Lee et al. | 715/763 |
| 6,883,137 | B1 | 4/2005 | Girardot et al. | 715/513 |
| 6,898,604 | B1* | 5/2005 | Ballinger et al. | 707/101 |
| 6,901,402 | B1 | 5/2005 | Corston-Oliver et al. | 701/101 |
| 6,904,560 | B1 | 6/2005 | Panda | 715/202 |
| 6,925,457 | B2 | 8/2005 | Britton et al. | 707/1 |
| 6,925,470 | B1 | 8/2005 | Sangudi et al. | 707/102 |
| 6,944,857 | B1 | 9/2005 | Glaser et al. | 717/173 |
| 6,948,133 | B2 | 9/2005 | Haley | 715/780 |
| 6,950,831 | B2 | 9/2005 | Haley | 707/104.1 |
| 6,950,982 | B1 | 9/2005 | Dourish | 715/512 |
| 6,957,385 | B2 | 10/2005 | Chan et al. | 715/504 |
| 6,963,867 | B2 | 11/2005 | Ford et al. | 707/3 |
| 6,964,010 | B1 | 11/2005 | Sharp | 715/507 |
| 6,975,983 | B1 | 12/2005 | Fortescue et al. | 704/9 |
| 6,976,090 | B2 | 12/2005 | Ben-Shaul et al. | 709/246 |
| 6,976,209 | B1 | 12/2005 | Storisteanu et al. | 715/512 |
| 6,981,212 | B1 | 12/2005 | Claussen et al. | 715/205 |
| 6,986,104 | B2 | 1/2006 | Green et al. | 715/523 |
| 6,990,654 | B2 | 1/2006 | Carroll, Jr. | 717/109 |
| 7,003,522 | B1 | 2/2006 | Reynar et al. | 707/10 |
| 7,013,289 | B2 | 3/2006 | Horn et al. | 705/26 |
| 7,024,658 | B1 | 4/2006 | Cohen et al. | 717/117 |
| 7,028,312 | B1 | 4/2006 | Merrick et al. | 719/330 |
| 7,032,174 | B2 | 4/2006 | Montero et al. | 715/257 |
| 7,039,859 | B1* | 5/2006 | Sundaresan | 715/229 |
| 7,051,076 | B2 | 5/2006 | Tsuchiya | 709/206 |
| 7,082,392 | B1 | 7/2006 | Butler et al. | 704/233 |
| 7,100,115 | B1 | 8/2006 | Yennaco | 715/748 |
| 7,113,976 | B2 | 9/2006 | Watanabe | 709/206 |
| 7,146,564 | B2 | 12/2006 | Kim et al. | 715/235 |
| 7,216,351 | B1 | 5/2007 | Maes | 719/328 |
| 7,237,190 | B2* | 6/2007 | Rollins et al. | 715/234 |
| 7,281,245 | B2 | 10/2007 | Reynar et al. | 717/173 |
| 7,302,634 | B2* | 11/2007 | Lucovsky et al. | 715/200 |
| 7,305,354 | B2 | 12/2007 | Rodriguez et al. | 705/26 |
| 7,392,479 | B2 | 6/2008 | Jones et al. | 715/513 |
| 7,421,645 | B2 | 9/2008 | Reynar | 715/206 |
| 7,454,459 | B1* | 11/2008 | Kapoor et al. | 709/203 |
| 2001/0029605 | A1 | 10/2001 | Forbes et al. | 717/11 |
| 2001/0041328 | A1 | 11/2001 | Fisher | 434/157 |
| 2001/0042098 | A1 | 11/2001 | Gupta et al. | 709/206 |
| 2001/0049702 | A1* | 12/2001 | Najmi | 707/513 |
| 2001/0056461 | A1 | 12/2001 | Kampe et al. | 709/201 |
| 2002/0002590 | A1 | 1/2002 | King et al. | 709/206 |
| 2002/0003469 | A1 | 1/2002 | Gupta | 340/407.1 |
| 2002/0003898 | A1 | 1/2002 | Wu | 382/187 |
| 2002/0004803 | A1 | 1/2002 | Serebrennikov | 715/513 |
| 2002/0007309 | A1 | 1/2002 | Reynar | 705/14 |
| 2002/0023113 | A1 | 2/2002 | Hsing et al. | 707/513 |
| 2002/0023136 | A1 | 2/2002 | Silver et al. | 709/206 |
| 2002/0026450 | A1 | 2/2002 | Kuramochi | 707/104.1 |
| 2002/0029304 | A1 | 3/2002 | Reynar et al. | 709/332 |
| 2002/0035581 | A1 | 3/2002 | Reynar et al. | 715/513 |
| 2002/0038180 | A1 | 3/2002 | Bellesfield et al. | 701/202 |
| 2002/0065110 | A1 | 5/2002 | Enns et al. | 455/566 |
| 2002/0065891 | A1 | 5/2002 | Malik | 709/206 |
| 2002/0066073 | A1 | 5/2002 | Lienhard et al. | 717/105 |
| 2002/0078222 | A1 | 6/2002 | Compas et al. | 709/232 |
| 2002/0091803 | A1 | 7/2002 | Imamura et al. | 709/220 |
| 2002/0099687 | A1* | 7/2002 | Krishnaprasad et al. | 707/1 |
| 2002/0100036 | A1 | 7/2002 | Moshir et al. | 717/173 |
| 2002/0103829 | A1 | 8/2002 | Manning et al. | 707/513 |
| 2002/0104080 | A1 | 8/2002 | Woodard et al. | 717/176 |
| 2002/0110225 | A1 | 8/2002 | Cullis | 379/67.1 |
| 2002/0111928 | A1 | 8/2002 | Haddad | 707/1 |
| 2002/0120685 | A1 | 8/2002 | Srivastava et al. | 709/203 |
| 2002/0129107 | A1 | 9/2002 | Loughran et al. | 709/206 |
| 2002/0133523 | A1 | 9/2002 | Ambler et al. | 707/536 |
| 2002/0149601 | A1 | 10/2002 | Rajarajan et al. | 345/619 |
| 2002/0156774 | A1 | 10/2002 | Beauregard et al. | 707/3 |
| 2002/0156792 | A1 | 10/2002 | Gombocz et al. | 707/100 |
| 2002/0169802 | A1 | 11/2002 | Brewer et al. | 707/513 |
| 2002/0175955 | A1 | 11/2002 | Gourdol et al. | 345/821 |
| 2002/0178008 | A1 | 11/2002 | Reynar | 704/272 |
| 2002/0178182 | A1 | 11/2002 | Wang et al. | 715/501.1 |
| 2002/0184247 | A1 | 12/2002 | Jokela et al. | 707/204 |
| 2002/0188941 | A1 | 12/2002 | Cicciarelli et al. | 717/175 |
| 2002/0196281 | A1 | 12/2002 | Audleman et al. | 345/762 |
| 2002/0198909 | A1 | 12/2002 | Huynh et al. | 707/513 |
| 2003/0002391 | A1 | 1/2003 | Biggs | 368/82 |
| 2003/0005411 | A1 | 1/2003 | Gerken | 717/120 |
| 2003/0009489 | A1* | 1/2003 | Griffin | 707/500 |
| 2003/0014745 | A1 | 1/2003 | Mah et al. | 717/170 |
| 2003/0025728 | A1 | 2/2003 | Ebbo et al. | 345/744 |
| 2003/0046316 | A1 | 3/2003 | Gergic et al. | 707/513 |
| 2003/0050911 | A1* | 3/2003 | Lucovsky et al. | 707/1 |
| 2003/0051236 | A1 | 3/2003 | Pace et al. | 717/177 |
| 2003/0056207 | A1 | 3/2003 | Fischer et al. | 717/174 |
| 2003/0081791 | A1 | 5/2003 | Erickson et al. | 380/282 |
| 2003/0083910 | A1 | 5/2003 | Sayal et al. | 705/7 |
| 2003/0084138 | A1 | 5/2003 | Tavis et al. | 709/223 |

| | | | |
|---|---|---|---|
| 2003/0097318 A1 | 5/2003 | Yu et al. ............... 705/35 |
| 2003/0101190 A1* | 5/2003 | Horvitz et al. ............ 707/100 |
| 2003/0101204 A1 | 5/2003 | Watson ............... 708/206 |
| 2003/0101416 A1 | 5/2003 | McInnes et al. ............ 715/513 |
| 2003/0106040 A1 | 6/2003 | Rubin et al. ............ 717/106 |
| 2003/0115039 A1 | 6/2003 | Wang ............... 704/4 |
| 2003/0121033 A1 | 6/2003 | Peev et al. ............ 717/175 |
| 2003/0126136 A1 | 7/2003 | Omoigui ............... 707/10 |
| 2003/0140308 A1 | 7/2003 | Murthy et al. ............ 715/500 |
| 2003/0154144 A1 | 8/2003 | Pokorny et al. ............ 705/28 |
| 2003/0158841 A1 | 8/2003 | Britton et al. ............... 707/3 |
| 2003/0158851 A1 | 8/2003 | Britton et al. ............ 707/100 |
| 2003/0167445 A1* | 9/2003 | Su et al. ............... 715/513 |
| 2003/0172343 A1* | 9/2003 | Leymaster et al. ......... 715/500 |
| 2003/0177341 A1* | 9/2003 | Devillers ............... 712/227 |
| 2003/0182391 A1 | 9/2003 | Leber et al. ............... 709/1 |
| 2003/0192040 A1 | 10/2003 | Vaughan ............... 171/173 |
| 2003/0195937 A1 | 10/2003 | Kircher et al. ............ 709/207 |
| 2003/0212527 A1 | 11/2003 | Moore et al. ............ 702/179 |
| 2003/0220795 A1 | 11/2003 | Araysantiparb et al. ..... 704/275 |
| 2003/0229593 A1 | 12/2003 | Raley et al. ............ 705/55 |
| 2003/0233330 A1 | 12/2003 | Raley et al. ............ 705/55 |
| 2004/0002939 A1* | 1/2004 | Arora et al. ............... 707/1 |
| 2004/0003389 A1 | 1/2004 | Reynar et al. ............ 717/178 |
| 2004/0006564 A1* | 1/2004 | Lucovsky et al. ............ 707/10 |
| 2004/0006741 A1 | 1/2004 | Radja et al. ............ 715/513 |
| 2004/0024875 A1* | 2/2004 | Horvitz et al. ............ 709/226 |
| 2004/0039990 A1 | 2/2004 | Bakar et al. ............ 715/505 |
| 2004/0044959 A1* | 3/2004 | Shanmugasundaram et al. ............ 715/513 |
| 2004/0068694 A1* | 4/2004 | Kaler et al. ............ 715/513 |
| 2004/0083218 A1* | 4/2004 | Feng ............... 707/100 |
| 2004/0133846 A1 | 7/2004 | Khoshatefeh et al. ....... 715/500 |
| 2004/0143581 A1* | 7/2004 | Bohannon et al. ............ 707/100 |
| 2004/0165007 A1 | 8/2004 | Shafron ............... 345/781 |
| 2004/0199861 A1 | 10/2004 | Lucovsky ............... 715/500 |
| 2004/0201867 A1 | 10/2004 | Katano ............... 358/1.15 |
| 2004/0236717 A1 | 11/2004 | Demartini et al. ............ 707/1 |
| 2005/0050164 A1 | 3/2005 | Burd et al. ............... 709/217 |
| 2005/0055330 A1 | 3/2005 | Britton et al. ............... 707/1 |
| 2005/0094850 A1 | 5/2005 | Nakao ............... 382/103 |
| 2005/0108195 A1 | 5/2005 | Yalovsky et al. ............ 707/1 |
| 2005/0120313 A1 | 6/2005 | Rudd et al. ............ 715/866 |
| 2005/0187926 A1 | 8/2005 | Britton et al. ............... 707/3 |
| 2006/0173674 A1 | 8/2006 | Nakajima et al. ............ 704/9 |

FOREIGN PATENT DOCUMENTS

| | | |
|---|---|---|
| CN | 200410005390.8 | 10/2008 |
| EP | 0 364 180 A2 | 4/1990 |
| EP | 0481784 A2 | 4/1992 |
| EP | 0598511 A | 5/1994 |
| EP | 0872827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1 447 754 A1 | 8/2004 |
| EP | 1 452 966 A3 | 9/2004 |
| JP | 64-88771 | 4/1989 |
| JP | 05-174013 | 7/1993 |
| JP | 08-272662 | 10/1996 |
| JP | 09-138636 | 5/1997 |
| JP | 10-171827 | 6/1998 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2001-0350464 | 12/2001 |
| JP | 2002-041353 | 2/2002 |
| JP | 2002163250 A | 6/2002 |
| JP | 2002-222181 | 8/2002 |
| JP | 2003-141174 | 5/2003 |
| WO | WO 95/07510 A1 | 3/1995 |
| WO | WO 99/17240 A1 | 4/1999 |
| WO | WO 00/54174 A1 | 9/2000 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/86390 A2 | 11/2001 |
| WO | WO 02/99627 A1 | 1/2002 |
| WO | WO 02/15518 A2 | 2/2002 |
| WO | WO 02/42928 A1 | 5/2002 |
| WO | WO 2004/012099 A2 | 2/2004 |

OTHER PUBLICATIONS

Wilker, John, ColdFusion MX adds J2EE, XML, and Web services compatibility, Aug. 9, 2002 http://builder.com.com/5102-6387-1045285.html.*

Brroks-Bilson, Rob, Programming ColdFusion [electronic resource] 2001, Safari Tech Books Online, 1st edition.*

U.S. Appl. No. 10/164,960, filed Jun. 6, 2002, Reynar et al.

"Integrating with External Systems: iPlanet™ Unified Development Server", Sun Microsystems, Inc., Ver. 5.0, Aug. 2001, pp. 127-156.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp . . . , Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw . . . , Microsoft Corporation, 1999-2001, pp. 1.

"BizTalk Server 2002 Compiling Data", http://msdn.microsoft.com/library/en-us/bts_2002/htm/lat_xmltools_map_concept_drgl.a . . . , Microsoft Corporation, 1999-2001, pp. 1.

"BizTalk Server 2002 Testing Maps", http://msdn.microsoft.com/library/en- us/bts_2002/htm/lat_xmltools_map_concept_fhhy.a . . . , Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as . . . , Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/ presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21vseepr.mspx, May 2001, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"Integrated Development Environment (IDE)", http://web.archive.org/web/20020602032242/http://altova.com/products_ide.html, Jun. 2002, pp. 1-2.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

"Altova markup your mind!", http://web.archive.org/web/20021204211721/http://altova.com/products_ide.html, Dec. 2002, pp. 1-3.

"Arbortext and Accessibility", http://web.archive.org/web/20021219133536/www.arbortext.com/html/accessibility.html, Dec. 2002, pp. 1-5.

"XML Compliance, 100% Pure XML", http:web.archive.org/web/20021209185855/www.arbortext.com/html/xml_compliance, Dec. 2002, pp. 1-3.

"Schemas", http://web.archive.org/web/20021221023148/www.arbortext.com/html/schemas.html, Dec. 2002, pp. 1-3.

"Arbortext's Support for XSL-FO", http://web.archive.org/web/20021221021632/www.arbortext.com/html/xsl-fo.html. Dec. 2002, pp. 1-4.

"Corel XMetal[4], Making XML Content Creation Easy", http://web.archive.org/web/20031118215158/www.corel.com/servlet/Satellite?pagename, Nov. 2003, pp. 1-2.

"Corel XMetal 4 and Interwoven TeamXML", www.corel.com/futuretense_cs/ccurl/corel+xml+4+and+interwoven+teamxml.pdf, Aug. 2003, pp. 1-2.

"The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Fernandez M. et al., "SilkRoute: Trading Between Relations and XML", *Computer Networks*, Elsevier Science Publishers B.V., Amsterdam NL, vol. 33, No. 1-6, Jun. 2000, pp. 723-745.

Braganholo VDP; "Updating Relationship Databases Through XML Views", *Technical Report RP-328*, Online (http://www.inf.ufrgs.br/(vanessa/disc/iplinas/PropostaTese.pdf), Porto Alegre, RS, Brasil, Sep. 2002, XP-002279067, pp. 1-61.

Falquet G et al., "Design and Analysis of Active Hypertext Views on Databases",*CUI-Technical Report*, Online (http://cui.unige.ch/isi/reports/design/anls/ahtv.pdf), Jan. 2002, XP-002279068, pp. 1-24.

Ceri S et al., "Deriving Production Rules for Incremental View Maintenance", *Proceedings of the International Conference on Very Large Data Bases*, 1994, XP-00914159, pp. 577-589.

Bonifati A., "Active Behaviors Within XML Document Management", *EDBT Ph.D. Workshop*, (EDBT Ph.D. WS 2000), Online (http://www.edbt2000.uni-konstanz.de/phd-workshop/papers/Bonifati.ps), Mar. 2000, Konstanz, Germany, XP-002279069, pp. 1-4.

U.S. Final Office Action dated Oct. 19, 2006 cited in U.S. Appl. No. 09/906,467.

European Communication dated Sep. 25, 2006 in EP 03 01 4181.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.

European Communication dated Apr. 19, 2006 in EP 05 000 506.5-1527.

European Communication dated Nov. 9, 2006 in EP 03010292.5.

"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.

"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.

Santos, C.A.S., L.F.G Soares, G.L. de Souza and J.P. Courtiat; *Design methodology and formal validation of hypermedia documents*; Proceedings of the sixth ACM international conference on multimedia, (1998) p. 39-48.

Terveen, Loren, Will Hill and Brian Amento; *Constructing, organizing, and visualizing collections of tropically related Web resources*; ACM Trans. Comput.-um. Interact. 6, 1 (Mar. 1999) p. 67-94.

Barrett, Rob, Paul P. Maglio and Daniel C. Kellem; *How to personalize the Web*; Conference proceedings on human factors in computing systems (1997) p. 75-82.

Marx, Matthew and Chris Schmandt; *CLUES: dynamic personalized message filtering*; Proceedings of the ACM 1996 conference on computer supported cooperative work (1996) p. 113-121.

Goschka, Karl M. and Jurgen Falb; *Dynamic hyperlink generation for navigation in relational databases*; Proceedings of the tenth ACM conference on hypertext and hypermedia: returning to our diverse roots (1999) p. 23-24.

Pentland, Alex; *Perceptual user interfaces: perceptual intelligence*; Commun. ACM 43, 3 (Mar. 2000) p. 35-44.

Stairmand, Mark A.; *Textual context analysis for information retrieval*; Proceedings of the 20th annual international ACM SIGIR conference on research and development in information retrieval (1997) p. 140-147.

Glushko, Robert J., Jay M. Tenenbaum and Bart Meltzer; *An XML framework for agent-based E-commerce*; Commun. ACM 42, 3 (Mar. 1999) p. 106.

Kukich, Karen; *Technique for Automatically Correcting Words in Text*; ACM Comput. Surv., 24, 4 (Dec. 1992); pp. 377-439.

Marx, Matt and Chris Schmandt; *Putting People First: Specifying Proper Names in Speech Interfaces*; Proceedings of the ACM Symposium on User Interface Software and Technology; 1994; pp. 29-37.

Ford, Bryan, Mike Hibler, Jay Lepreau, Roland McGrath and Patrick Tullman; *Interface and execution models in the fluke kernel*; Proceedings of the third symposium on operating systems design and implementation, (1999) p. 101-115.

Desmarais, Michel C. and Jiming Liu; *Exploring the applications user-expertise assessment for intelligent interfaces*; Proceedings of the conference on human factors in computing systems, (1993) p. 308-313.

Foley, James D.; *Future directions in user-computer interface software*; Conference proceedings on organizational computer systems, (1991) p. 289-297.

Hartson, H. Rex and Deborah Hix; *Human-computer interface development: concepts and systems for its management*; ACM Comput. Surv. 1 (Mar. 1989) p. 5-92.

Foley, Jim; *Integrating computer technology, people technology; strategies and case studies from Georgia Tech's Graphics, Visualization and Usability Center*; Proceedings of the workshop on advanced visual interfaces, (1994) p. 34-43.

Tsai, M., P. Reiher and G.J. Popek; *Command management system for next-generation user input*; Proceedings of the seventh workshop on hottopics in operating systems, (1999) p. 179-84.

*Microsoft Computer Dictionary*, Microsoft, Microsoft Press, Fifth Edition, p. 409.

Kuenning, Geoff, "Using ISPELL from Emacs", http://theochem.ki.ku.dk/on_line_docs/ispell/ispell_1.html, 4 pp., publication date unknown.

"Spellout Command", Commands Reference, vol. 5, http://www.rz.uni-hohenheim.de/betriebssysteme/unix/aix/aix_4.3.3_doc/base_doc/base_doc/usr/_share/man/inf . . . , 1 page, publication date unknown.

"Chapter 8_Standard Input and Output", http://www.comp.lancs.ac.uk/computing/users/eiamjw/unix/chap8.html, 3 pp., publication date unknown.

Panagiotis, Christias, Man-cgi 1.15, http://www.physics.umn.edu/cgi-bin/man-cgi?spell, 1994, 5 pp.

Bischof, Hans-Peter, "Spell, Spellin, Spellout—Finding Spelling Errors", http://www.vorlesungen.uni-osnabrueck.de/informatik/shellscript/Html/Man/_Man_NeXT_html/html . . . , Apr. 21, 1997, 2 pp.

"Module 123—Spell", http://duplex.hypermart.net/books/bsd/501-504.html, 4 pp., publication date unknown.

Panagiotis, Christias, Man-cgi 1.15, http://www.calpoly.edu/cgi-bin/man-cgi?spell+1, 1994, 3 pp.

Martensson, Bengt, "Thread-Enhanced Spell Front End for GNU Emacs + Detex + Delatex", http://www.geocrawler.com/archives/3/337/1987/8/0/1871981/, Aug. 20, 1987, 1 page.

Willisson, Pace, Ispell (1), http://www.rt.com/man/findaffix.1.html, 1983, 15 pp.

Willisson, Pace, Ispell (1), "User Commands", http://www.csee.usf.edu/cgi-bin/man-cgi?ispell, 1983, 18 pp.

"Handout 38: Spell Checking, Word Counting, and Textual Analysis", http://courses.cs.emporia.edu/pheattch/courses/2002/cs501s02/hand38/, 3 pp., publication date unknown.

Keunning, Geoff, "International Spell", http://fmg-www.cs.ucla.edu/geoff.ispell.html, 3 pp., publication date unknown.

Ispell 4, "Ispell—Format of Ispell Dictionaries and Affix Files", http://www.bigbiz.com/cgi-bin/manpage?4+ispell, 11 pp., publication date unknown.

McMahon, Lee. E., "SED—A Non-Interactive Text Editor," Bell Laboratories, Murray Hill, New Jersey 07974, Aug. 15, 1978, p. 16.

Beitner, N. D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12, publication date unknown.

IBM Corporation, IBM Research Disclosure #368; "Multimedia Hyperlinks Automatically Created For Reference Documents," *IBM Technical Disclosure* Bulletin, Jun. 1993, pp. 1-5.

*The Complete LINUX™ Operating System 5.2 Deluxe*, Red Hat,® Macmillian Digital Publishing USA, A Viacom Company, Red Hat Software, Inc., ISBN 1-57595-199-1B, 1995-1998, pp. 1-385.

*User Manual for AddressMate and AddressMate Plus*, CoStar Corporation, AddressMate Software, 1994-1995, pp. 1-210.

*Getting Results With Microsoft® Office 97, Real World Solutions For The Work You Do*, Microsoft Corporation, 1995-1997, pp. 1-703.

*InfoCentral™ 7*, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531, publication date unknown.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997, 61 pp.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.

Hewkin, "Smart Tags-the Distributed-Memory Resolution", IEE Review, Jun. 22, 1989, pp. 203-206.

Measuring Units Conversion Table—http://web.archie.org- 1997 Internet French Property, pp. 1-4.

IBM Technical Disclosure Bulletin, "National Language Support Enhancement for Culture-Specific Operations", Nov. 1, 1993, vol. 36, Issue 11, pp. 629-638.

Towers, J. Tarin, Visual Quickstart Guide: Dreamweaver 2 for Windows and Macintosh, 1999, Peachpit Press, pp. 150-151.

Driza, Scott, "Learn Word 2000 VBA Document Automation", Wordware Publishing Inc., 2001, 6 pp.

Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.

Menu Customizing, IBM Technical Disclosure Bulletin, vol. 34, No. 1, Jun. 1991, pp. 91-92 (4 pp. total).

Perry, Brad, et al., "Discovering Similar Resources by Content Park-Linking", Proceedings of the Sixth International Conference on Information and Knowledge Management, published by ACM Press 1997, pp. 317-324.

Schulz, Charles, "Writing Applications for Uniform Operation on a Mainframe or PC: A Metric Conversion Program", Lockheed Missles & Space Company, Inc., Sunnyvale, CA, May 1990, pp. 348-361.

Devanbue, P. et al., "Chime: customizable hyperlink insertion and maintenance engine for software engineering environments", Software Engineering, Publication date: 1999, ISBN: 1-58113-07400.

"Using Flyswat", http://www.flywsat.com/using.html, download date: Sep. 28, 1999, 1 pp.

"What is Flyswat", http://www.flyswat.com, download date: Sep. 28, 1999, 5 pp.

"Intelligent Text Processing: About", http://www.syntalex.co.uk/about/about.html, download date: Aug. 7, 1999, 1 pp.

"Intelligent Text Processing: Automatic Cross-Referencing", http://www.syntalex.co.uk/services/acrl.html, download date Aug. 7, 1999, 3 pp.

"Intelligent Text Processing: Case Study: Context", http://www.syntalex.co.uk/casestudies/context.html, download date: Aug. 7, 1999, 3 pp.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

Homer, Alex et al., Professional Active Services Pages, 1997, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

Toth, V., "Visual C++ 4 Unleashed", 1996, Sams Publishing, p. 174.

Sriram, V., "ComponentXchange: An E-Exchange for Software Components", Master Thesis, CitSeer, May 2001, pp. i-v, 1-77.

Bosak, "XML: The Universal Publishing Format", SGML/XML Europe '98, May 1998, pp. A1-C17.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990-Nov. 2, 1990, pp. 255-260.

Boone, "Concept Features in Re: Agent, An Intelligent Email Agent", Proceedings of the 2nd International Conference on Autonomous Agents, May 9-13, 1998, pp. 141-148.

Takkinen et al., "Café : A Conceptual Model for Managing Information in Electronic Mail", Proceedings of the Annual Hawaii International Conference on System Sciences, 1998, pp. 44-53.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

Harold, E.R., "XML: Extensible Markup Language", IDG Books Worldwide, Books 24x7.com printout, 1998, pp. 1-11.

Marais, Hannes, "Supporting Cooperative and Personal Surfing With a Desktop Assistant", 1997, ACM Press, pp. 129-138.

U.S. Appl. No. 09/818,157, filed Mar. 27, 2001, entitled "Automatically Adding Proper Names to a Database".

U.S. Appl. No. 09/841,265, filed Apr. 24, 2001, entitled "Method and System for Applying Input Mode Bias".

U.S. Appl. No. 09/841,266, filed Apr. 24, 2001, entitled "Method and System for Providing Electronic Commerce Actions Based on Semantically Labeled Strings".

U.S. Appl. No. 09/906,552, filed Jul. 16, 2001, entitled "Method and System for Providing Restricted Actions for Recognized Semantic Categories".

U.S. Appl. No. 09/906,467, filed Jul. 16, 2001, entitled "Application Program Interfaces for Semantically Labeling Strings and Providing Actions Based on Semantically Labeled Strings".

U.S. Appl. No. 09/907,418, filed Jul. 17, 2001, entitled "Method and System for Defining Semantic Categories and Actions".

U.S. Appl. No. 09/588,411, filed Jun. 6, 2000, entitled "Method and System for Semantically Labeling Strings and Providing Actions Based on Semantically Labeled Strings".
U.S. Appl. No. 10/141,712, filed May 9, 2002, entitled "Method, System, and Apparatus for Converting Dates Between Calendars and Languages Based Upon Semantically Labeled Strings".
U.S. Appl. No. 10/154,630, filed May 23, 2002, entitled "Method, System, and Apparatus for Converting Numbers Based Upon Semantically Labeled Strings".
U.S. Appl. No. 10/140,544, filed May 7, 2002, entitled "Method, System, and Apparatus for Converting Numbers Between Measurement Systems Based Upon Semantically Labeled Strings".
U.S. Appl. No. 10/155,680, filed May 23, 2002, entitled "Method, System, and Apparatus for Converting Currency Values Based Upon Semantically Labeled Strings".
U.S. Appl. No. 10/164,960, filed Jun. 6, 2002, entitled "Providing Contextually Sensitive Actions and Help Content in Computer-Generated Documents".
U.S. Appl. No. 10/179,810, filed Jun. 25, 2002, entitled "Method, System, and Apparatus for Performing Custom Actions on Digital Content".
U.S. Appl. No. 10/178,680, filed Jun. 24, 2002, entitled "System and Method for Incorporating Smart Tags in Online Content".
U.S. Appl. No. 10/179,438, filed Jun. 25, 2002, entitled "Method and System for Dynamically Providing Actions Associated with Semantically Labeled Strings".
U.S. Appl. No. 10/184,298, filed Jun. 27, 2002, entitled "Method and System for Associating Actions with Semantic Labels in Electronic Documents".
U.S. Appl. No. 10/377,258, filed Feb. 28, 2003, entitled "Method and System for Enhancing Paste Functionality of a Computer Software Application".
U.S. Appl. No. 10/426,446, filed Apr. 29, 2003, entitled "Methods and System for Recognizing Names in a Computer-Generated Document and for Providing Helpful Actions Associated with Recognized Names".
U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".
U.S. Appl. No. 10/780,376, filed Feb. 17, 2004, entitled "Methods and Systems for Providing Automatic Actions on Recognized Text Strings in a Computer-Generated Document".
U.S. Appl. No. 10/183,317, filed Jun. 25, 2002, entitled "System and Method for Issuing a Message to a Program".
U.S. Official Action dated Dec. 29, 2003 in U.S. Appl. No. 09/588,411.
U.S. Official Action dated Feb. 12, 2004 in U.S. Appl. No. 10/154,630.
U.S. Official Action dated Mar. 29, 2004 in U.S. Appl. No. 09/906,552.
U.S. Official Action dated Jun. 14, 2004 in U.S. Appl. No. 09/588,411.
U.S. Official Action dated Jun. 18, 2004 in U.S. Appl. No. 09/818,157.
U.S. Official Action dated Jul. 15, 2004 in U.S. Appl. No. 09/906,467.
U.S. Official Action dated Aug. 20, 2004 in U.S. Appl. No. 09/841,266.
U.S. Official Action dated Sep. 29, 2004 in U.S. Appl. No. 09/907,418.
U.S. Official Action dated Oct. 6, 2004 in U.S. Appl. No. 09/818,157.
U.S. Official Action dated Nov. 2, 2004 in U.S. Appl. No. 10/178,680.
U.S. Official Action dated Dec. 8, 2004 in U.S. Appl. No. 09/588,411.
U.S. Official Action dated Jan. 25, 2005 in U.S. Appl. No. 09/906,552.
U.S. Official Action dated Jan. 26, 2005 in U.S. Appl. No. 10/154,630.
U.S. Official Action dated Mar. 1, 2005 in U.S. Appl. No. 09/818,157.
U.S. Official Action dated Mar. 17, 2005 in U.S. Appl. No. 09/841,265.
U.S. Official Action dated Mar. 24, 2005 in U.S. Appl. No. 10/141,712.
U.S. Official Action dated Apr. 8, 2005 in U.S. Appl. No. 10/164,960.
U.S. Official Action dated Apr. 19, 2005 in U.S. Appl. No. 09/841,266.
U.S. Official Action dated May 5, 2005 in U.S. Appl. No. 09/906,467.
U.S. Official Action dated May 6, 2005 in U.S. Appl. No. 09/907,418.
U.S. Official Action dated May 20, 2005 in U.S. Appl. No. 10/184,298.
U.S. Official Action dated Jun. 3, 2005 in U.S. Appl. No. 10/154,630.
U.S. Official Action dated Jun. 6, 2005 in U.S. Appl. No. 10/164,260.
U.S. Official Action dated Jun. 24, 2005 in U.S. Appl. No. 10/140,544.
U.S. Official Action dated Jul. 25, 2005 in U.S. Appl. No. 10/179,438.
U.S. Official Action dated Oct. 4, 2005 in U.S. Appl. No. 10/183,317.
U.S. Official Action dated Oct. 5, 2005 in U.S. Appl. No. 10/179,810.
U.S. Official Action dated Oct. 20, 2005 in U.S. Appl. No. 09/906,552.
U.S. Official Action dated Nov. 2, 2005 in U.S. Appl. No. 10/184,190.
U.S. Official Action dated Nov. 10, 2005 in U.S. Appl. No. 10/164,260.
U.S. Official Action dated Nov. 15, 2005 in U.S. Appl. No. 09/841,265.
U.S. Official Action dated Nov. 22, 2005 in U.S. Appl. No. 10/141,712.
U.S. Official Action dated Dec. 5, 2005 in U.S. Appl. No. 09/907,418.
U.S. Official Action dated Dec. 14, 2005 in U.S. Appl. No. 10/608,267.
U.S. Official Action dated Dec. 15, 2005 in U.S. Appl. No. 10/155,680.
U.S. Official Action dated Jan. 11, 2006 in U.S. Appl. No. 09/841,266.
U.S. Official Action dated Jan. 17, 2006 in U.S. Appl. No. 10/140,544.
U.S. Official Action dated Feb. 2, 2006 in U.S. Appl. No. 09/906,467.
U.S. Official Action dated Feb. 16, 2006 in U.S. Appl. No. 10/184,298.
U.S. Official Action dated Feb. 24, 2006 in U.S. Appl. No. 10/154,630.
U.S. Appl. No. 10/184,190, filed Jun. 27, 2002, entitled "System and Method for Providing Namespace Related Information", Inventors: Jones et al.
U.S. Appl. No. 10/164,260, filed Jun. 5, 2002, entitled "Mechanism for Downloading Software Components from a Remote Source for Use by a Local Software Application", Inventors: Reynar et al.
U.S. Final Office Action dated Jul. 26, 2007 cited in U.S. Appl. No. 10/164,960.
U.S. Office Action dated Aug. 16, 2007 cited in U.S. Appl. No. 10/179,810.
U.S. Office Action dated Sep. 10, 2007 cited in U.S. Appl. No. 10/179,438.
Fernandex M. et al., "SilkRoute: Trading Between Relations and XML", *Computer Networks*, Elsevier Science Publishers B. V., Amsterdam NL, vol. 33, No. 1-6, Jun. 2000, pp. 723-745.
U.S. Appl. No. 10/731,899, filed Dec. 9, 2003, entitled "Mechanism for Downloading Software Components from a Remote Source for Use by a Local Software Application", Inventors: Jones et al.
U.S. Office Action dated Feb. 8, 2008 cited in U.S. Appl. No. 10/141,712.
U.S. Office Action dated Feb. 15, 2008 cited in U.S. Appl. No. 10/731,899.
U.S. Final Office Action dated Feb. 20, 2008 cited in U.S. Appl. No. 10/154,630.
Singapore Examination Reported (conducted by Austrian Patent Office) dated Jan. 25, 2008 cited in SG Application No. 200500214-2.
Chinese Official Action dated Dec. 28, 2007 cited in Application No. 200410005390.8.
Chinese Official Action dated Jan. 4, 2008 cited in Application No. 200510009487.0.
Wei Ying-bin et al., "A New Technology ColdFusion of Realizing Dynamic Webpage," 2000, 6 pgs. (English language translation, pp. 1-6).
European Examination Report dated Mar. 4, 2006 cited in EP Application No. 02 014 717.9-1527.

European Examination Report dated Mar. 4, 2006 cited in EP Application No. 03 012 432.5-1527.
Russian Official Action dated Jan. 11, 2008 cited in Russian Application No. 2004105880/09(006292).
V. Doroth et al., "Modern Computer Vocabulary," St. Petersburg, BHV-Peterburg, 2001, p. 465 (with English language translation).
U.S. Official Action mailed Apr. 1, 2008 cited in U.S. Appl. No. 09/907,418.
U.S. Official Action mailed Apr. 4, 2008 cited in U.S. Appl. No. 10/155,680.
U.S. Official Action mailed Apr. 29, 2008 cited in U.S. Appl. No. 09/588,411.
U.S. Final Official Action mailed Apr. 29, 2008 cited in U.S. Appl. No. 10/179,810.
U.S. Official Action mailed May 1, 2008 cited in U.S. Appl. No. 10/183,317.
European Communication Summons to Attend Oral Proceedings dated Mar. 4, 2008 in EP 05 000 506.5-1527.
European Communication Summons to Attend Oral Proceedings dated Mar. 10, 2008 in EP 03 01 0292.5-1527.
Malaysian Search Report dated Aug. 2, 2007 cited in Malaysian Application No. PI 20040265.
U.S. Office Action dated Sep. 27, 2007 cited in U.S. Appl. No. 10/608,267.
European Communication Minutes of Oral Proceedings and Decision dated Sep. 15, 2008 in European Application No. 05 000 506.5-1527.
Polish Second Official Action dated Oct. 28, 2008 in Polish Application No. P36553.
Australian First Examiner's Report dated Sep. 15, 2008 cited in Application No. 2003204379.
Japanese Final Official Action dated Nov. 25, 2008 cited in Application No. 2002-207514.
T. Hara et al., "Inside Microsoft.NET-Complete Explanation, 'What Microsoft Aims For'", msdn magazine, No. 6, pp. 20-35, ASCII, Japan, Sep. 18, 2000, 19 pp.
Japanese Official Action dated May 26, 2009 cited in Application No. 2005-039754.
Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese—no translation yet).
(Previously cited) Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).
U.S. Office Action dated Feb. 4, 2009 cited in U.S. Appl. No. 10/377,258.
U.S. Final Office Action dated Mar. 4, 2009 cited in U.S. Appl. No. 10/780,376.
European Summons to Attend Oral Proceedings dated Feb. 26, 2009 cited in European Application No. 0301283.0-2211.
European Communication dated Mar. 18, 2009 cited in European Application No. 04003683.2-2211.
European Summons to Attend Oral Proceedings dated Mar. 20, 2009 cited in European Application No. 03012830.0.
Japanese Official Action dated Feb. 6, 2009 cited in Japanese Application No. 2003-180218.
Japanese Official Action dated Feb. 13, 2009 cited in Japanese Application No. 2003-162911.
Japanese Official Action dated Feb. 24, 2009 cited in Japanese Application No. 2003-16133.
Japanese Official Action dated Mar. 6, 2009 cited in Japanese Application No. 2004-042140.
Mexican Official Action dated Feb. 11, 2009 cited in Application No. PA/a/2003/005451.
Chinese Final Rejection dated Mar. 13, 2009 cited in Application No. 03145242.6.
Japanese Final Rejection dated Mar. 17, 2090 cited in Application No. 2004-037158.
Japanese Final Rejection dated Apr. 3, 2009 cited in Application No. 2002-207514.
C. Goldfarb, XML Handbook, 1$^{st}$ Ed., Pearson Education, Japan, May 10, 1999, pp. 246-254 (no English translation).
S. Tanaka, "Verifying the XML Schema Definition," XML Magazine, Shoeisha Co., Ltd., vol. 10, No. 3, Jul. 1, 2000, pp. 135-155 (no English translation).
U.S. Office Action dated Apr. 20, 2009 cited in U.S. Appl. No. 10/426,446.
U.S. Office Action dated Apr. 27, 2009 cited in U.S. Appl. No. 10/154,630.
Chinese Decision on Rejection dated Jul. 3, 2009 cited in Application No. 03143003.1.
European Summons to Attend Oral Proceedings dated Aug. 5, 2009 cited in Application No. 03003931.7.
"The Spatial Smart Tag", Geomatic Technologies, Mar. 10, 2005, 2 pp.
Harmon, D., "Microsoft MapPoint 2002", Geoworld Quick-Take Reviews, Aug. 2001, 3 pp.
Irie R. et al., "Resources for Place Name Analysis", May 28, 2004, 4 pp.
Rajabifard, A. et al., "Creating an Enabling Platform for the Delivery of Spatial Information", Spatial Sciences Institute Biennial Conference, Sep. 12, 2005, 10 pp.
Camarda, B., Special Editing Using® Microsoft® Office Word 2003, Que, Dec. 12, 2003, pp. 1-5.
Ivens, K., Office XP Smart Tags, Microsoft, Mar. 6, 2002, pp. 1-4.
Frye, C., Microsoft Office Systems: Step by Step, Microsoft Press, 2003 Edition, Sep. 3, 2003, pp. 1-6.
U.S. Official Action mailed Sep. 8, 2006 in U.S. Appl. No. 10/948,948.
U.S. Official Action mailed Feb. 15, 2007 in U.S. Appl. No. 10/948,948.
U.S. Official Action mailed Oct. 18, 2007 in U.S. Appl. No. 10/948,948.
U.S. Official Action mailed Mar. 20, 2008 in U.S. Appl. No. 10/948,948.
U.S. Official Action mailed Oct. 16, 2008 in U.S. Appl. No. 10/948,948.
U.S. Official Action mailed Oct. 16, 2008 in U.S. Appl. No. 10/154,630.
European Search Report dated Dec. 12, 2006 in European Application No. 05 105 000.3-1527.
European Examination Report dated Oct. 9, 2007 in European Application No. 05 105 000.3-1527.
European Preliminary Opinion dated Aug. 27, 2008 cited in European Application No. 04002224.6—1527 / 1447754.
Chinese Official Action dated Dec. 7, 2007 in Chinese Application No. 200510088529.4.
Chinese Second Official Action dated Aug. 15, 2008 in Chinese Application No. 200510088529.4.
Chilean Second Office Action cited in Chilean Application No. 67-2005 (date unknown).
Malaysian Official Action dated Aug. 29, 2008 cited in Malaysian Application No. PI 20031902.
Polish Official Action dated Aug. 27, 2008 in Polish Application No. P360520.
European Communication dated Dec. 11, 2006 in EP 03 012 830.0-2211.
Singapore Search Report/Written Opinion dated Jan. 26, 2007 in SG 200500214-2.
U.S. Official Action dated Feb. 6, 2007 cited in U.S. Appl. No. 09/588,411.
U.S. Official Action dated Feb. 7, 2007 cited in U.S. Appl. No. 10/179,438.
European Communication dated Nov. 17, 2006 in EP 03 011 851.7-2211.
European Communication dated Feb. 16, 2007 cited in European Application No. 04 003 683.2-2211.
Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleld-437, 8 pgs.

Rice, F.C., "Transform XML Files with XSLT When Importing into Microsoft Excel 2002," Jul. 2001, Internet article, XP-002420701, http://msdn2.microsoft.com/en-us/library/aa140055(office.10.d=printer).aspx, 9 pgs.

Johnson, L., "What's So Special About Paste Special?", Jun. 2002, Internet article, XP-002420702, http://pubs.logicalexpressions.com/Pub0009/LPMArticle.asp?ID=40, 5 pgs.

U.S. Official Action dated Mar. 9, 2007 cited in U.S. Appl. No. 10/426,446.

U.S. Official Action dated Mar. 12, 2007 cited in U.S. Appl. No. 10/141,712.

U.S. Official Action dated Apr. 10, 2007 cited in U.S. Appl. No. 09/907,418.

Australian First Official Action dated Oct. 21, 2008 cited in Application No. 2003204800.

U.S. Final Office Action dated Dec. 24, 2008 cited in U.S. Appl. No. 09/841,265.

Sharon Oviatt et al., "Integration and Synchronization of Input Modes during Multimodal Human-Computer Interaction," CHI 97, Atlanta, Georgia, Mar. 22-27, 1997, pp. 415-422.

U.S. Office Action dated Dec. 23, 2008 cited in U.S. Appl. No. 10/179,810.

U.S. Office Action dated Jan. 5, 2009 cited in U.S. Appl. No. 10/141,712.

European Statement regarding Grounds of Appeal dated Jan. 13, 2009 cited in Application No. 04 002 224.6.

Rubin, C., "Microsoft Word 2000 Official Manual", First Edition, Nikkei BP Soft Press, Inc., Aug. 2, 1999, pp. 215-217.

U.S. Office Action dated May 27, 2008 cited in U.S. Appl. No. 09/906,552.

U.S. Examiner's Answer BPAI dated Jun. 5, 2008 cited in U.S. Appl. No. 10/184,298.

U.S. Office Action dated Jun. 11, 2008 cited in U.S. Appl. No. 09/841,265.

U.S. Office Action dated Jun. 12, 2008 cited in U.S. Appl. No. 10/426,446.

U.S. Office Action dated Jun. 13, 2008 cited in U.S. Appl. No. 10/780,376.

U.S. Final Office Action dated Jun. 27, 2008 cited in U.S. Appl. No. 10/377,258.

M. Stowe, "XML in Excel and the Spreadsheet Component", Microsoft Corporation, Aug. 2001, 6 pgs.

C. Heinemann, "Cross-Reference your XML Data", Microsoft Corporation, Dec. 7, 1998, 6 pgs.

D. Obasanjo, "XML_Namespaces and How They Affect Xpath and XSLT", Microsoft Corporation, May 20, 2002, 19 pgs.

European Communication Summons to Attend Oral Proceedings dated May 7, 2008 cited in European Application No. 04002224.6.

Russian Official Action dated Mar. 13, 2008 cited in Russian Application No. 2004104096/09(004398).

Japanese Official Action dated Mar. 28, 2008 cited in Japanese Application No. 2003-178497.

Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.

European Communication dated Jun. 3, 2008 cited in European Application No. 03 011 851.7-2211.

Japanese Official Action dated Apr. 18, 2008 cited in Japanese Application No. 2003-128417.

U.S. Office Action dated Jan. 25, 2008 cited in U.S. Appl. No. 10/608,267.

U.S. Official Action dated Dec. 20, 2006 in U.S. Appl. No. 10/154,630.

U.S. Final Official Action dated Dec. 26, 2006 in U.S. Appl. No. 10/179,810.

U.S. Official Action dated Jan. 5, 2007 in U.S. Appl. No. 10/183,717.

U.S. Official Action dated Jan. 11, 2007 in U.S. Appl. No. 10/184,190.

U.S. Official Action dated Jan. 25, 2007 in U.S. Appl. No. 10/608,267.

U.S. Official Action dated May 14, 2004 in U.S. Appl. No. 09/906,332.

U.S. Final Official Action dated May 18, 2007 cited in U.S. Appl. No. 10/133,680.

U.S. Official Action dated May 30, 2007 cited in U.S. Appl. No. 09/906,467.

U.S. Final Official Action dated Jun. 15, 2007 cited in U.S. Appl. No. 10/733,899.

Biaheta et al., "Assigning Function Tags to Passed Text,", Morgan Kaufmann Publishers Inc., 2006, pp. 234-240.

U.S. Final Office Action dated Dec. 26, 2007 cited in U.S. Appl. No. 09/841,265.

U.S. Office Action dated Dec. 26, 2007 cited in U.S. Appl. No. 10/377,258.

U.S. Final Office Action dated Jan. 7, 2008 cited in U.S. Appl. No. 10/179,438.

U.S. Final Office Action dated Jan. 9, 2008 cited in U.S. Appl. No. 09/906,467.

David D. Lewis et al., "A Sequential Algorithm for Training Text Classifiers," Spring-Verlag New York, Inc., 1994, pp. 1-10.

U.S. Office Action dated Jun. 28, 2007 cited in U.S. Appl. No. 09/841,266.

U.S. Final Office Action dated Jul. 12, 2007 cited in U.S. Appl. No. 10/184,293.

U.S. Office Action dated Jul. 13, 2007 cited in U.S. Appl. No. 10/194,630.

U.S. Office Action dated Jul. 26, 2007 cited in U.S. Appl. No. 09/841,265.

U.S. Appl. No. 11/924,856, filed Oct. 26, 2007 entitled "Providing Contextually Sensitive Tools and Help Content in Computer-Generated Documents".

U.S. Office Action dated Oct. 9, 2007 cited in U.S. Appl. No. 10/183,317.

U.S. Final Office Action dated Oct. 16, 2007 cited in U.S. Appl. No. 09/907,418.

U.S. Office Action dated Oct. 17, 2007 cited in U.S. Appl. No. 10/155,680.

U.S. Final Office Action dated Oct. 19, 2007 cited in U.S. Appl. No. 10/184,190.

U.S. Final Office Action dated Oct. 19, 2007 cited in U.S. Appl. No. 09/588,411.

U.S. Final Office Action dated Oct. 19, 2007 cited in U.S. Appl. No. 10/141,712.

U.S. Final Office Action dated Oct. 30, 2007 cited in U.S. Appl. No. 09/906,552.

European Communication dated Sep. 25, 2007 cited in European Application No. 03 014 181.6-1243.

Japanese Official Action dated Oct. 19, 2007 cited in Japanese Application No. 2003-128417.

Rubin, Charles, "Microsoft Word 2000 Official Manual," First Edition, Nikkei BP Soft Press, Inc., Aug. 2, 1999, pp. 215-217.

U.S. Final Office Action dated Dec. 7, 2007 cited in U.S. Appl. No. 10/426,446.

Polish Official Letter dated Jun. 24, 2008 cited Polish Application No. P 365553.

U.S. Final Office Action dated Jul. 29, 2008 cited in U.S. Appl. No. 10/141,712.

"XML Schema Part 2: Datatypes," W3C, May 2, 2001, http://www.w3.org/TR/2001/REC-xmlschema-2-20010502/, pp. 1-146 (separated into 2 documents—A & B).

Ghamrawi et al., "Collective Multi-Label Classification," ACM, 2005, pp. 195-200.

Polish Official Action dated Jul. 21, 2008 cited in Polish Application No. P 364854.

Japanese Office Action dated Jul. 18, 2008 cited in Japanese Application No. 2002-207514.

Japanese Office Action dated Oct. 10, 2008 cited in Application No. 2004-037158.

Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53.

Chinese Office Action dated Oct. 17, 2008 cited in Application No. 03145242.6.

U.S. Final Office Action dated Dec. 8, 2008 cited in U.S. Appl. No. 10/183,317.

Russian Official Action dated Jun. 21, 2009 cited in Application No. 2005104223/09(005505).

D. Richter, "Windows for professionals" (Win32 API programming for Windows NT 3.5 and Windows 95, translation from English, Moscow: Russian Edition, 1995, ISBN 5-7502-0010-8, pp. 26, 31, 215.

U.S. Final Office Action dated Nov. 30, 2009 cited in U.S. Appl. No. 10/179,810.

Glover et al., "Inferring hierarchical Descriptions," ACM, 2002, pp. 507-514.

Malaysian Examination Report dated Nov. 30, 2009 cited in Application No. PI 20040559.

Australian Third Official Action dated Dec. 23, 2009 cited in Application No. 2003204478.

Japanese Official Notice of Final Rejection dated Oct. 27, 2009 cited in Application No. 2003-161338.

Australian First Official Action Report dated Jan. 18, 2009 cited in Application No. 2004200459.

Polish Official Notice dated Aug. 25, 2009 cited in Application No. P.365553/DP.

Australian Official Action dated Sep. 11, 2009 cited in Application No. 2003204478.

Norwegian Official Action dated Aug. 24, 2009 cited in Application No. 2003 2550.

Polish Official Notice dated Sep. 22, 2009 cited in Application No. P. 364854/DP.

Polish Official Notice dated Sep. 23, 2009 cited in Application No. P. 360520/DP.

Korean Official Action dated Sep. 30, 2009 cited in Application No. 10-2003-40988.

Japanese Official Notice of Final Rejection dated Oct. 2, 2009 cited in Application No. 2003-162911.

* cited by examiner

LINKING ELEMENTS OF A DOCUMENT TO CORRESPONDING FIELDS, QUERIES AND/OR PROCEDURES IN A DATABASE

FIELD OF THE INVENTION

This invention relates generally to methods and systems for linking elements in a computer-generated document to corresponding data in a database.

BACKGROUND OF THE INVENTION

Computer software applications allow users to create a variety of documents to assist them in work, education and leisure. For example, word processing applications allow users to create letters, articles, books, memoranda and the like. Spreadsheet applications allow users to store, manipulate, print and display a variety of alphanumeric data. Such applications have a number of well-known strengths including rich editing, formatting, printing, and calculation.

With the advent of modern databases, users are able to amass and manipulate large quantities of data associated with a variety of different subjects. Often, databases are located on a user's computer, or databases may be included on remote servers including remote Internet-based servers. Often many users may have access to a single database where each of the users add to, delete from, and manipulate data contained therein. For example, if a number of users constitute a project team developing a specification for a new type of computer software, each of the users may be assigned access to a shared document library contained on a given database. Accordingly, if a first user changes a section of the data contained in the specification, that change will be updated on the database and will be accessible by other users. Subsequently, another authorized user may gain access to the database to see changes made by the first user and to make additional changes or updates. Accordingly, each of the users may develop and contribute to the data contained and managed in the database in a collaborative manner.

Often, a user or group of users must assemble data from a given database into a letter, memorandum, article, spreadsheet, or other document for presenting the data to others. Continuing with the example described above, members of a software development team may be required at various points in a project to assemble the data contained in their shared database into a single document, such as a specification document, to present that document to future users of the new software or to a reviewer of the project. Unfortunately, once the document is prepared, the document becomes a static presentation of the data assembled from the database as it existed just before preparation of the document. If members of the project team update the data in the database after preparation of an initial draft of the document, the document must then be manually updated to reflect changes in the data upon which the document is based. Likewise, if during the preparation of the document, members make changes to data being placed in the document, the corresponding data in the database must then be manually updated to reflect changes made to the document that are not reflected in the data contained in the database.

Accordingly, there is a need for methods and systems for mapping and linking parts of document content to corresponding fields or queries in a database so that updates to the corresponding data in the database will automatically update corresponding parts of the document, and updates to parts of the document will automatically update the corresponding data in the database. It is with respect to these and other considerations that the present invention has been made.

SUMMARY OF THE INVENTION

Embodiments of the present invention provide methods and systems for mapping and linking elements in a document to corresponding fields or queries in a database. A user of a computer-generated document such as a word processing document or a spreadsheet document associates various parts of the document with corresponding data in a database. According to one aspect of the invention, the document is annotated with structural elements of a markup language such as Extensible Markup Language (XML) in order to map portions of the document to the corresponding data in the database. If the document is marked up with XML structure, an XML schema is attached to or associated with the document for setting the data types, data structures and XML elements rules for the document so that the user may annotate the document with the appropriate XML structure that adheres to the selected schema. Alternatively, the user may utilize the document already containing XML structural annotation and already associated with an XML schema.

After the document has been structured with one or more elements, a database is selected for association with the document. Selecting the database may include selecting a particular table within a document library maintained in the database where the particular table is associated with the document. After the particular table is selected within the database for association with the document, individual elements within the document are mapped to corresponding data fields or queries within the selected table. Queries may be represented as programs written in a database language such as SQL. Queries may be represented using stored procedures, in which case an element in the document may be mapped to a particular stored procedure in the database. Mapping the individual elements in the document to corresponding data fields or queries within the selected tables of the database may include providing a unique document identifier in the document to link (for data sending and receiving) each of the individual elements to a corresponding data field, query or procedure within the selected table or a stored procedure. Likewise, a unique identifier may be provided in the selected data fields, queries or stored procedures for linking individual data fields, queries or procedures to corresponding elements within the document.

Once individual elements within the document are mapped and linked to corresponding data within the selected table or database, changes made to individual elements within the document automatically cause updates to corresponding data fields, queries and/or procedures to which those elements are mapped and linked. If document elements are linked to queries, providing the data for those elements, then they will typically also be linked to appropriate update queries that are able to update the database with the contents of the elements in the document, in order to maintain a two-way link between the document and the database. Conversely, changes made to individual data fields, queries and/or procedures within the selected database tables automatically update corresponding elements within the document. If the elements are linked to queries, then when the elements in the document refresh their data, they will call the queries they are associated with for the latest set of results.

These and other features, advantages and aspects of the present invention may be clearly understood and appreciated from a review of the following detailed description of the disclosed embodiments and by reference to the appended drawings and claims.

DETAILED DESCRIPTION

The following description of embodiments of the present invention is made with reference to the above-described drawings wherein like numerals refer to like parts or components throughout the several figures. The present invention is directed to methods and systems for mapping and linking elements of a document to data fields, queries and/or procedures in a database.

Operating Environment

Figure 1:
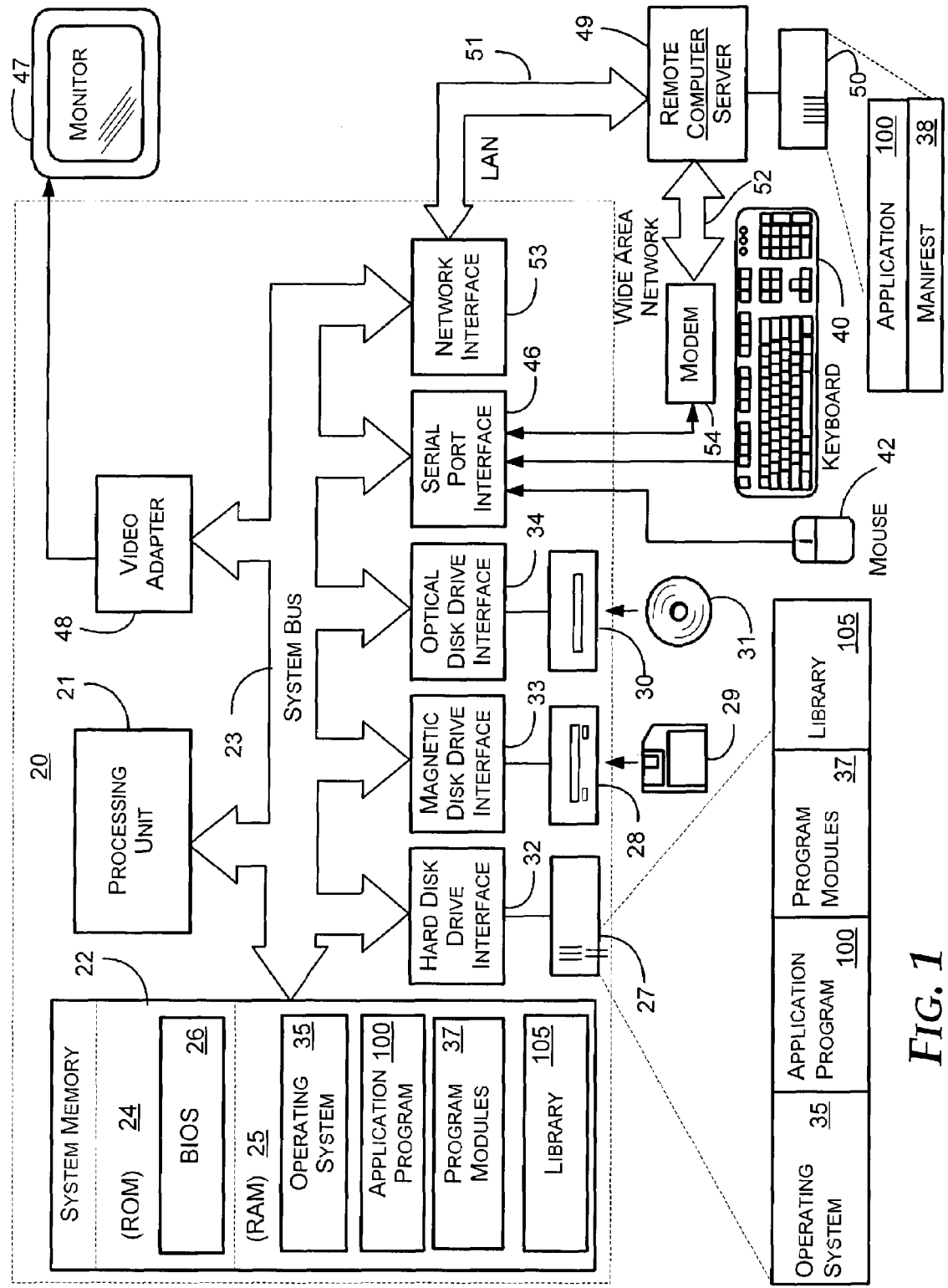
FIG. 1 is a block diagram of a computer and associated peripheral and networked devices that provide an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk end a CD-ROM disk, it should be appreciated by those skilled in the art that other types of media which are readable by a computer, such as magnetic cassettes, flash memory cards, digital video disks, and Bernoulli cartridges may also be used in the exemplary operating environment. The aforementioned are exemplary and other types of media which are readable by a computer may be used.

A number of program modules may be stored in the drives and RAM 25, including an operating system 35, one or more application programs 100, a word processor program module 37 (or other type of program module), program data, such as the manifest 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Operation

Figure 2:
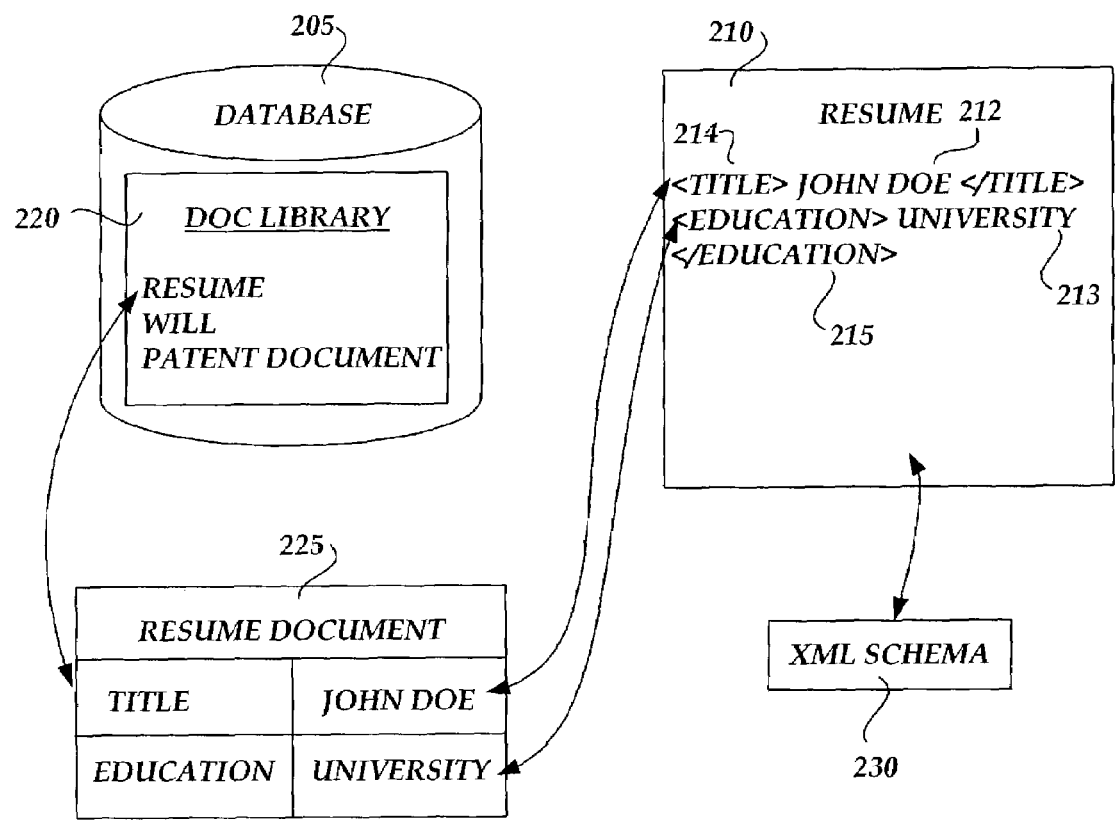
FIG. 2 is a simplified block diagram illustrating interaction between a document and a database where individual elements within the document are mapped and linked to corresponding data fields, queries and/or procedures within the database.

FIG. 2 is a simplified block diagram illustrating interaction between a document and a database where individual elements within the document are mapped and linked to corresponding data fields, queries and/or procedures within the database. According to embodiments of the present invention, a user associates elements within a document with corresponding data fields, queries and/or procedures in a database. As shown in FIG. 2, an illustrative document 210 is shown for linking elements within the document to corresponding data fields, queries and/or procedures contained in a database 205. As should be understood by those skilled in the art, the document 210 is illustrative of documents that may be created and utilized from a variety of software applications including word processor applications, spreadsheet applications, web browser applications, and the like. For purposes of example only, the document 210 is illustrative of a word processing document wherein the user is preparing a resume having a title 212 and an education section 213. As should be understood by those skilled in the art, the text illustrated in FIG. 2 is for purposes of example only, and the data entered into the document may be in any type of format including alphanumeric text and images allowable by the software application under which the document is created.

In order to prescribe, map and link elements within the document 210 to corresponding data fields, queries and/or procedures in the database 205, elements within the document 210 are structurally annotated so that those elements may be identified and pointed to corresponding data fields, queries and/or procedures within the database 205. According to an embodiment of the present invention, structural annotation is provided to the document 210 using a markup language such as the Extensible Markup Language (XML). As shown in document 210, an XML element <title> element is applied to the document to provide structure for the title section 212 of the document and an <education> element 215 is applied to the document for providing structure to the education section 213 of the document.

Document elements are linked and mapped to corresponding data fields, queries and procedures in the database by providing a unique identifier (ID) number to the document and by associating the unique document ID with the a given record in a given table in the database. Accordingly, the correct record may be found in the database when a corresponding element in the document is modified and the correct element in the document may be found when a corresponding record in the database is modified. Preferably the unique ID number is stored in the document.

In order to provide the document with a set of grammatical rules governing the type and structure of data that may be included in the document, as illustrated in FIG. 2, an XML schema is attached to or associated with the document for providing the rules governing each of the XML elements with which the user may annotate the document. For example, the resume document may have an attached or associated schema file 230 such as "resume-schema.xsd" for providing the allowable set of XML elements such as <title>, <education>, <experience>, <personal interest>, and so on. The schema file includes the rules governing the order with which those elements may be applied to the document and specific rules associated with individual elements applied to the document. For example, a schema attached to or associated with the resume document, illustrated in FIG. 2 may prescribe that data associated with the <education> element must include the name of a college or university followed by the address of the college or university.

As is understood by those skilled in the art, developers of XML schema files determine the names of XML elements and the associated data types and data structures allowed for those elements. Then, all users of documents annotated with XML structure according to a given schema file 230 may utilize the data contained within the XML structure without regard for the overall type and structure of the document. For example, if the resume document, illustrated in FIG. 2, is transmitted to a prospective employer, the prospective employer may develop software applications for parsing the document to locate specific types of data within the document for use by the prospective employer. The prospective employer, for example, may wish to create a database of colleges and universities from which prospective employees have graduated. Using the schema file 230 attached to the document, the prospective employer will know that the data associated with the <education> element has been prepared according to the schema file governing the document. Accordingly, the prospective employer may develop a software application for locating the <education> element and for extracting the data associated therewith for insertion into the prospective employer's database. As set forth above, in order to link the <education> element, for example, with an education record in the database, a unique identifier (ID) number must be stored in the document for associating the document and its elements with corresponding records in the database.

The prospective employer, according to this example, may extract this data without regard to other aspects of the document such as the location of and data contained within the title section. This is made possible by the fact that each user of the document follows the data type and data structure rules prescribed in the schema file attached to or associated with the document. The schema file 230 may be attached to the document, or the schema file may be maintained in a separate location such as a library of schema files accessible by the document. That is, the document may contain a file path pointer or a unique name space identifier (e.g., URI or URN) for locating and/or identifying the schema file 230 for providing the document rules governing the XML structure of the document.

As briefly described above, elements of the document, such as the <title> and <education> elements may be linked to data fields, queries and/or procedures within a data base 205 so that information updated in corresponding data fields, queries and/or procedures will automatically update data contained in corresponding elements contained within the document, and vice versa as described below.

Updates to the database may be done through various queries, for example using the structured query language (SQL), that affect multiple fields and tables in the database. In addition to coming directly from individual data fields, data in the document may come from the results of a query that assembles information from many fields and/or tables of the database based on various selection criteria. Additionally, as is understood by those skilled in the art, many databases support the use of stored procedures that are programs for executing commands against the database for writing data to the database, extracting data from the database and for manipulating data in the database.

In addition to associating data fields with elements in a document, queries and stored procedures may be associated with elements in the document. Two types of queries may be created for each element in order for the link between the element and the query to be "two-way" (read-write), as opposed to "one-way" (read-only). If only one query is provided for reading data from the database, then changes to the data can only be made in the database allowing the document to only read them. On the other hand, if only one query is provided that updates the database based on the data in the document, then only the document can be changed to update the database. A two-way link is created if two queries are provided where one query is for reading data from the database and one query is for writing into the database. Accordingly, the document or the database may be updated and the other will inherit those updates automatically. In some embodiments, it may be preferable to have only one-way linking. For example, a database administrator may prefer that changes to a particular data field may only be made by updating the database and not the document. Then only a query that reads the latest data from the database would be necessary to keep the document up-to-date with respect to the database.

For example, suppose the user is a patent attorney whose task is to author patent applications. Each patent application at his/her firm is assigned a unique document identifier (ID) number. Also suppose his firm uses a database to store the associations between patent attorney names and the patent applications assigned to each attorney. If he/she has been assigned a particular patent application document, then the database contains a record identifying him/her as the owner of that patent application document by storing his/her name and the document ID in the same data record in a given database table. In addition to this information being stored in the database, the format of the application document itself requires the document ID and the name of the attorney to appear in it. Without this invention, the name of the attorney would have to be entered into the database, and if the attorney name changes in the database (for example, the application is re-assigned to another attorney at the firm), the application document would have to be manually edited to replace the previous attorney name with the new attorney name.

According to an embodiment of the present invention, a means is provided for inserting into the document an appropriate association with the corresponding data in the database, so that if the corresponding data record in a given database table changes (for example, a different attorney gets assigned to the application document), the document will automatically reflect that change and update the attorney name appearing in the document. If the association is "two-way", meaning that a way for the document to update the database is also specified, then the attorney name may be changed in the document and the change will be updated in the database. The "two-way" association or communication is created is by marking up the attorney name in the document with an appropriate markup element (for example, <AttorneyName>, if XML is used) and specifying a mapping between that element and the appropriate query in the database (for example, represented by a stored procedure in the database called "GetCurrentAttorneyName" for reading from the database, and another procedure called "SetCurrentAttorneyName" for writing into the database.) This association itself may be stored in the document or in some part of a program module associated with the document.

At the database 205, data fields, queries and/or procedures corresponding to prescribed elements contained within the document 210 may be created for receiving, storing, sorting, and maintaining data associated with those elements. For example, a user of the resume document 210, illustrated in FIG. 2, may prepare a database record in the database 205 containing a data field associated with the <education> element 215 for maintaining data to be placed in the education section 213 of the resume document 210. As should be understood, the database may be organized according to a variety of logical associations of data. A particular data, query or procedure may be stored in a particular field. A collection of fields associated with a document may be assembled in a database record. A database table may include a number of records associated with a class of documents.

Once the corresponding data field is established in the database 205, the unique document ID, described above is written to the document 210 and associated with the <education> element to point that element to the corresponding record in the database 205 containing the data field with the data for the <education> element. Likewise, unique document ID is used to link the data field containing education data back to the <education> element of the document 210. Accordingly, when data in the education field of the database (205) record corresponding to this particular file is updated, the data contained in the education section 213 of the resume document 210 is automatically updated. Conversely, if the user changes the data contained in the education section 213 of the document 210, those changes are automatically sent to the education data field of the appropriate record in the database 205 to update data contained therein.

As should be understood by those skilled in the art, a software application program module may be written to both the document software application and the database software application for calling the corresponding data fields, queries and/or procedures or for calling the corresponding document element to request updates to the corresponding data field or to the corresponding document elements data when data is changed in either the database or the document. The software program module for directing the communication between the document element and the corresponding data field and vice versa may be a software program module written to the document application and/or the database application, or the program module may operate as an application programming interface or dynamic-link library accessible by the document application and/or database application. The database application and corresponding memory for the database 205 may be located remotely from the user's computer 20 on a remote computer server 49 accessible to the user's computer via Internet-based web server or database server or via an Internet connection to a remote database server.

According to an embodiment of the present invention, the database 205 may contain a document library 220 in which a variety of prescribed document types may be maintained along with associated data fields, queries and/or procedures. As will be described below, a user may select a document type from the document library 220 via the user's document application for opening a particular document that is already structurally annotated and associated with corresponding data fields, queries and/or procedures within the database. For example, if the user is a member of a project team preparing a patent application specification document, the patent application specification document may be contained in the document library 220. When the user desires to work on the patent application specification document, the user may select the patent application specification document from the document library via the database 205. The patent application specification document opens to the user using the user's document application with all structural annotation to the document already in place. For example, the patent application specification document may be in the form of a template containing XML markup annotation and an associated XML schema and file path pointers for allowing the user to begin preparation of the document from data downloaded from corresponding data fields, queries and/or procedures in the database 205, or the user may prepare the document by inserting data into the document that will then automatically be sent to corresponding data fields, queries and/or procedures contained within the database 205.

As shown in FIG. 2, upon selection of a given document from the document library 220 on the database side, the user may access the data fields, queries and/or procedures for the resume document associated with the resume document 210. Accordingly, the user may update data contained in the individual data fields, queries and/or procedures 225 in order to cause the data automatically to be updated in the corresponding document 210. The database 205 may be operated in a shared data environment where a number of users may have access to a single database such as the resume document database 225 for adding to, deleting from, and generally updating data contained in the corresponding data fields, queries and/or procedures. Because each data field such as the title data field in the resume document 225 is mapped to and linked to the corresponding title section 212 of the resume document 210, changes to the data contained in the title data field of the resume document 225 will cause an update of the information contained in the title section 212 of the document. For example, if the data in the title section of the resume document 225 is changed from "John Doe" to "Jane Doe", the information contained in the title section of the resume document 210 will automatically be changed from "John Doe" to "Jane Doe". Likewise, if the user opens the resume document 210 and changes the title from "John Doe" to "Jane Doe", the data contained in the title section of the resume document data field 225 at the database 205 likewise will be updated automatically.

Figure 3:
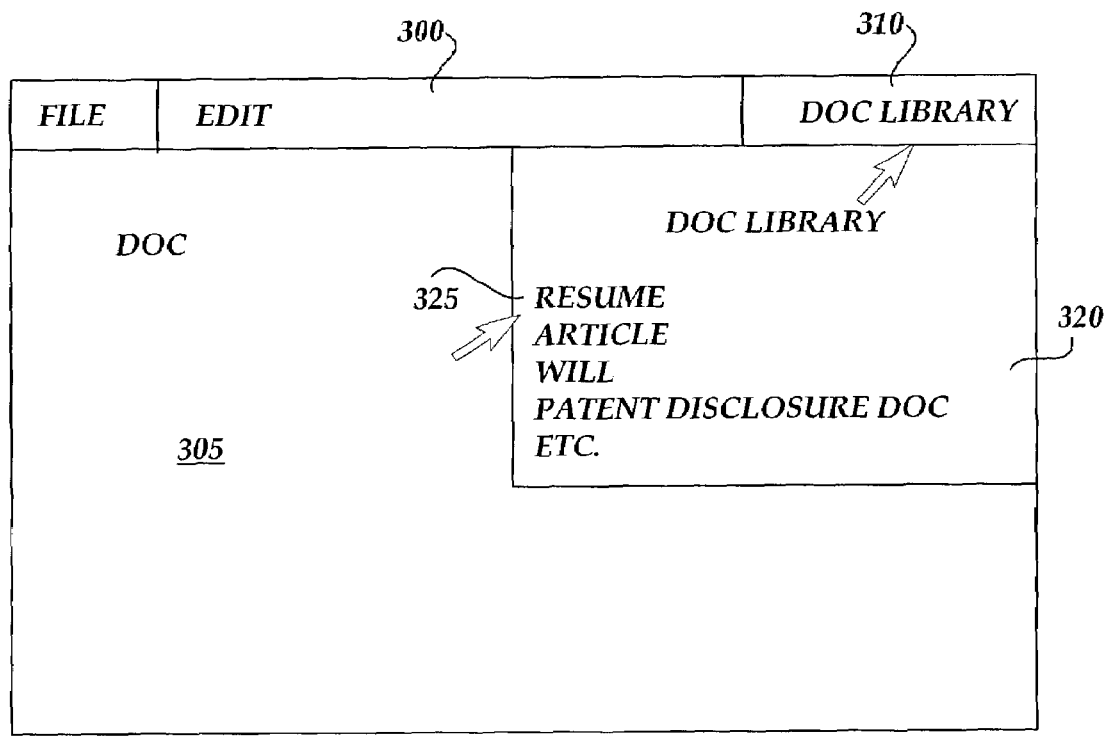
FIG. 3 illustrates a computer screen display of a software application for creating a document and for linking elements within the document to corresponding data fields, queries and/or procedures in a database.

FIG. 3 illustrates a computer screen display of a software application for creating a document and for linking elements within the document to corresponding data fields, queries and/or procedures in a database. According to one embodiment of the present invention, and as described briefly above, a document library 220 may be accessed at the database 205 for obtaining a previously created document that is mapped to a corresponding database or for obtaining a document template for creating a document that may be mapped to a corresponding database. Referring to FIG. 3, upon selection of an exemplary document library button 310 of the user's document application 300, a document library user interface 320 may be launched for providing the user with a list of available documents or document types. For example, the user may select the resume document 325 from the document library user interface 320 to launch the resume document 210 illustrated in FIG. 2.

Once the user launches the resume document 210 by selection of the resume document from the document library user interface 320, the resume document 210 is displayed to the user for editing. According to one embodiment of the present invention, the resume document launched may include the most recent version of the resume document 210 including data populated in each of the document elements from the corresponding data fields, queries and/or procedures of the database 205 because document elements are associated with corresponding database records by matching the unique document ID with corresponding database records. As described above with reference to FIG. 2, once the user updates data contained in the various elements of the resume document 210, the data contained in the corresponding data fields, queries and/or procedures of the database 205 is updated. Likewise, changes to data contained in corresponding data fields, queries and/or procedures of the database 205 will automatically update corresponding data contained in data elements of the resume document 210.

Alternatively, documents listed in the document library using interface 220 may include a variety of template documents accessible by the user for associating with corresponding data fields, queries and/or procedures in the database 205. According to an embodiment of the invention, each document type may include a number of structural elements such as XML elements to form a template for the desired document. After the user has completed the selected document, for example completing the education section of the resume document 210, the user may select a data location on the database 205 containing data fields, queries and/or procedures corresponding to the preformatted data elements of the selected document. Accordingly, when the user saves the prepared document, data inserted into the document will also be saved into corresponding data fields, queries and/or procedures in the database 205. Then, as described above, any time the corresponding data fields, queries and/or procedures in the database are changed or updated, the corresponding elements in the document will likewise be changed or updated and vice versa. If a new document is created and saved to the document library or database, a new document ID may be generated for it automatically so that a record corresponding to that document can be created in the database.

Figure 4:
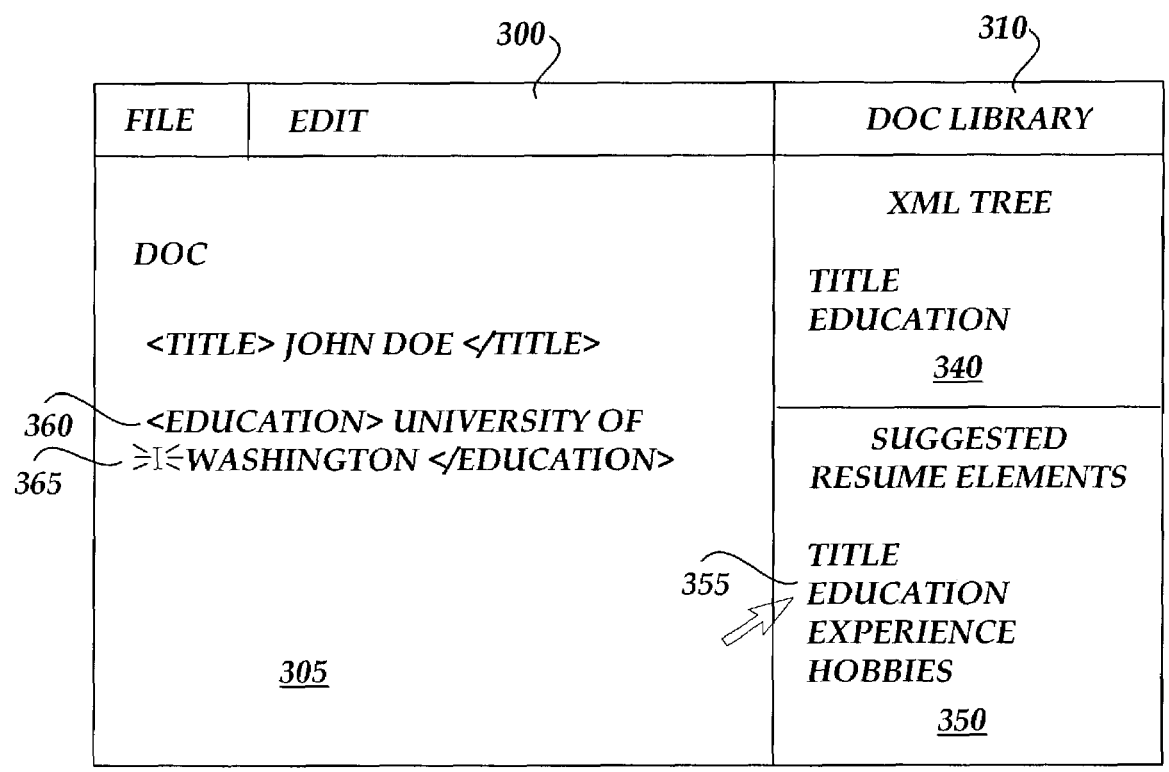
FIG. 4 illustrates a computer screen display of a software application for creating a document and for linking elements within the document to corresponding data fields, queries and/or procedures in a database.

Referring to FIG. 4, and according to an embodiment of the present invention, a document that is not presently mapped or linked to a corresponding database may be structured in order to link various elements of the document to corresponding data fields, queries and/or procedures in the database 205. For example, if the user prepares a document such as a resume document 210, by preparing the document in the data entry area 305 of his/her word processor 300, the user may select a resume document type from the document library user interface 320, described with reference to FIG. 3, in order to provide the user with a suggested list of elements to apply to the document being prepared by the user. As shown in FIG. 4, in response to selection of the resume document type, a suggested resume element pane 350 may be provided to the user to provide the user suggested elements for annotating the resume document with XML structure. According to one embodiment of the present invention, the user may enter the document and manually insert XML elements such as the <education> element 360, or the user may place his cursor 365 within the education section of the document and select the education element 355 from the pane 350 to automatically annotate the selected area of the document with the <education> element. As the user annotates the document with XML structure, an XML tree view pane 340 may be provided to show the user in outline form the XML structure applied to the document.

Once the newly created document is annotated with structure, such as XML element structure, the document elements may be linked to corresponding data fields, queries and/or procedures to allow communication between the document and the database 205, as described above. According to one embodiment of the present invention, the suggested elements provided to the user for annotating the document may be prepopulated with pointers to a corresponding data fields, queries and/or procedures in the database 205. Accordingly, annotation of the document with one of the suggested elements not only provides the desired structure to the document, but points the associated element to the corresponding data field in the database 205.

Figure 5:
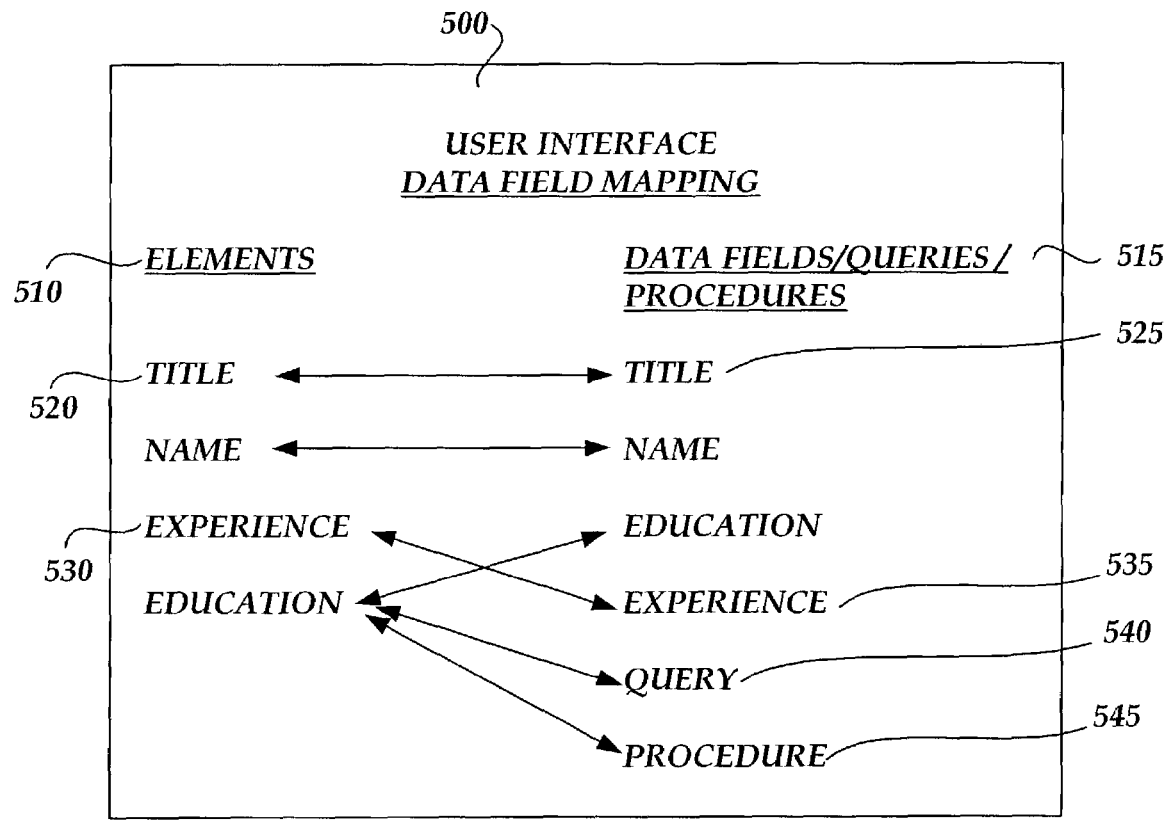
FIG. 5 is a simplified block diagram of a data field mapping user interface for allowing a user to map individual elements within a document to corresponding data fields, queries and/or procedures within a database.

Alternatively, referring to FIG. 5, a data field mapping user interface 500 may be provided to the user for mapping elements of the document with corresponding data fields, queries and/or procedures in the database 205. As shown in FIG. 5, a list of elements from the document may be populated into the user interface 500 along with an associated list of data fields, queries and procedures to which the document elements may be mapped and linked. As should be understood the user interface 500 is equally applicable for mapping document elements to queries 540 and procedures 545. That is, as is illustrated in FIG. 5, the user interface may be extended to include queries (for example, SQL statements) or names of stored procedures for data reading and writing between the document and the database.

For example, if the user desires that data inserted into the title section of the document should be mapped and linked to the title data field in the database 205, the user may select the <title> element followed by selection of the title data field in order to map and link the title element of the document to the title data field of the database 205. Accordingly, after mapping the title element to the title data field future changes to data contained in either the title section of the document or the title data field of the database 205 will cause changes in the corresponding document element or data field and vice versa. Once all desired document elements are mapped and linked to corresponding data fields, queries and/or procedures, and a unique ID for associating the document with a record or an appropriate set of data exists, data communication between document elements and corresponding data fields, queries and/or procedures is established.

Figure 6:
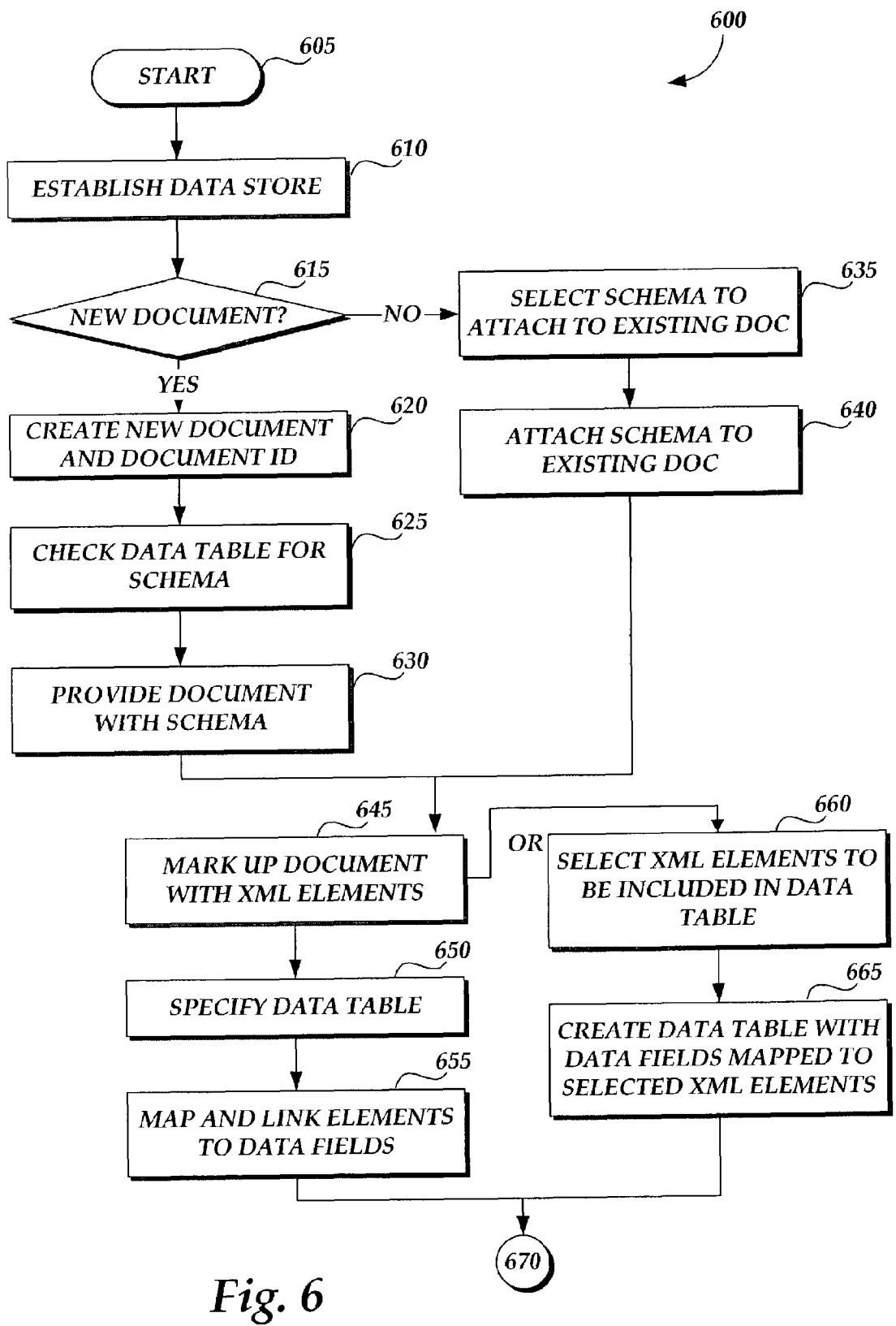
FIGS. 6 and 7 are flow charts illustrating a method for mapping and linking elements of a document to corresponding data fields, queries and/or procedures of a database.
Figure 7:
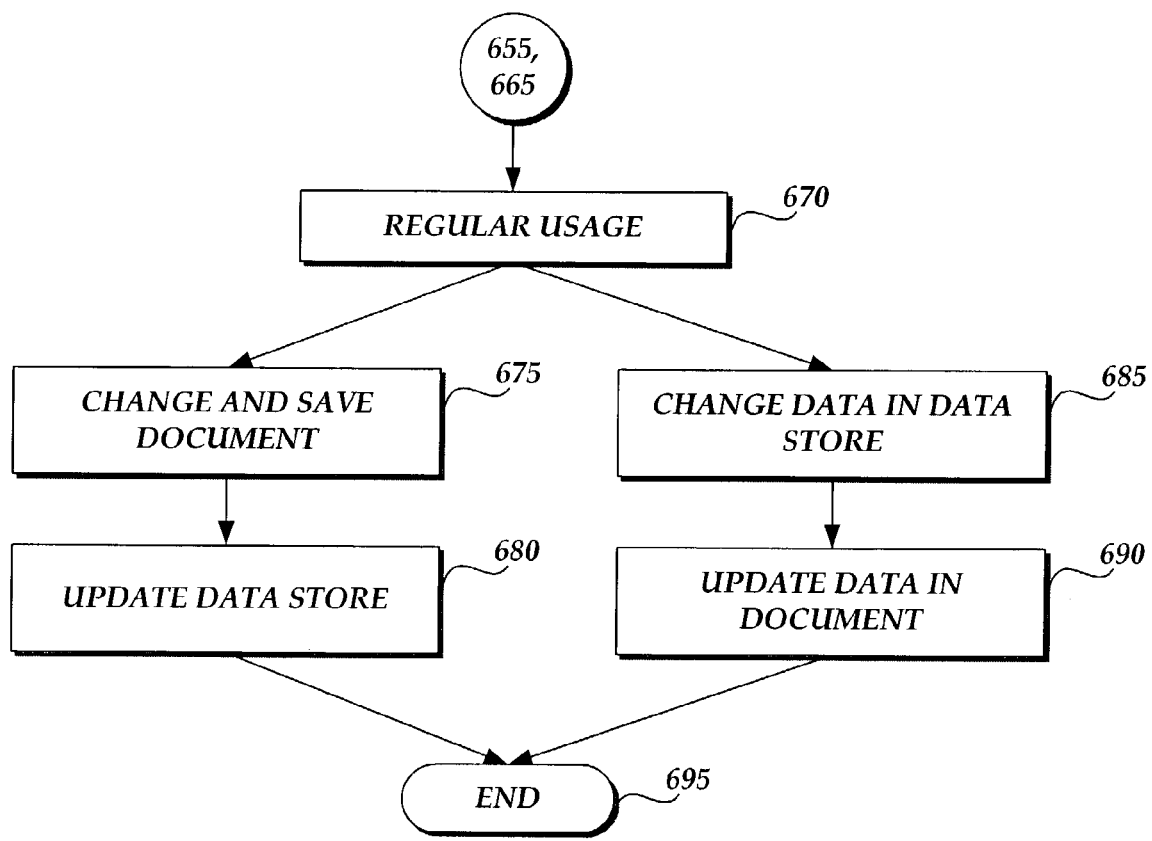

FIGS. 6 and 7 are flow charts illustrating a method for mapping and linking elements of a document to corresponding data fields, queries and/or procedures of a database. The method of 600 begins at start step 605 and moves to step 610 where a database or table 205 is established for maintaining and manipulating data. For purposes of discussion of FIGS. 6 and 7, assume for example that a table is established at the database 205 to maintain data used in preparation for an eventual patent application specification document. At step 615, a determination is made as to whether the user must create a new document. If not, the method proceeds to method 635 and a schema such as "patentspecificationdocumentschema.xsd" may be attached to an existing patent application specification document to provide the rules and procedures available for annotating the document with XML structure. At step 640, the schema is attached to the existing document. Alternatively, the document may already have an attached or associated schema.

If at step 615 a determination is made that a new document must be created, the method proceeds to step 620, and the user creates a new patent specification document and stores in the document a unique document ID for linking document elements to records in the database, as described above with reference to FIGS. 3, 4 and 5. At step 625, a check of the database 205 is performed to determine whether a schema for the new document being created by user is available. As discussed above with reference to FIGS. 3 and 4, this determination may be made by selecting the document library to determine whether the document library at the database 305 includes a document type that may be associated with the new document being created by the user. For example, as shown in FIG. 3, the user may select the patent disclosure document type from the document library user interface 320, and at step 630, the schema associated with the patent disclosure document type may be obtained and attached to the new document being prepared by the user.

At step 645, the document being created and/or selected by the user is annotated with XML elements as desired by the user. As should be understood, if the user has selected an existing document at step 615, no additional structural annotation may be required to the document. At step 650, the user may specify a table within the database 205 for associating the document elements with corresponding data fields, queries and/or procedures maintained in that table of the database 205. At step 655, as described above with reference to FIGS. 4 and 5, elements in the document are mapped and linked to corresponding data fields, queries and/or procedures within a given table in the database 205 in order to facilitate data communications between elements in the document and corresponding data fields, queries and/or procedures in the database 205.

Referring back to step 645, if a table has not been prepared at the database 205 for maintaining data associated with the document being created by the user, the user may specify XML elements included in the document to have corresponding data fields, queries and/or procedures within a selected table. For example, the database 205 may contain many tables in which a number of data fields, queries and/or procedures or document types may be included. The table may be established within the database 205 for maintaining data associated with patent specification documents. Within the table created for patent specification documents, a variety of subfiles may be created for maintaining data for individual patent specification documents. Within each subfile, a variety of data fields, queries and/or procedures may be created for associating with individual elements contained within the patent specification document being created by the user.

At step 660, individual data fields, queries and/or procedures within the selected table may be established for associating with XML elements applied to the document. According to one embodiment, annotation of the document and mapping of the document to suggested data fields, queries and/or procedures, as described above with reference to FIG. 5, establishes the corresponding data fields, queries and/or procedures within the selected table. Alternatively, at step 665, the user may enter the database 205 directly and create a table with data fields, queries and/or procedures that may be mapped to selected document elements as applied to the document being created by the user.

Once the document is prepared and annotated with XML structure, and once the data fields, queries and/or procedures for containing data corresponding to the document elements are established, the method proceeds to step 670, FIG. 7, where regular usage of the table and document may begin. At step 675, if the user changes and saves the document, the method proceeds to step 680 and data changed and saved in various elements of the document is updated at the table by updating corresponding data fields, queries and/or procedures in the table. On the other hand, at step 685, if the user makes changes directly to the data contained in the data fields, queries and/or procedures corresponding to elements in the document, the method proceeds to step 690 and data associated with corresponding data elements in the document is automatically updated as the corresponding data is changed in the corresponding data fields, queries and/or procedures. The method ends at step 695.

As described above, methods and systems are provided for mapping and linking elements of the document to corresponding data fields, queries and/or procedures in a database. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of linking elements in a computer-generated document to corresponding data in a database, comprising:

attaching a schema file associated with at least one intended use of the document to a document defining rules associated with a markup language to be applied to the document, wherein the markup language is XML and wherein the rules associated with the markup language to be applied to the document comprise names of elements of the markup language and data types associated with the names of the elements of the markup language;

applying the elements of the markup language to the document;

establishing data fields within the database for linking to corresponding markup language elements in the document;

writing a unique document identifier number to the document for linking the data fields in the database to the document, wherein linking the data fields in the database to the document comprises:

determining if a table associated with the document exists within a document library;

if no table is associated with the document, creating a table containing user-defined elements associated with the document;

selecting a table within a document library, the document library being maintained in the database where the table is associated with the document, and linking at least one markup language element in the document to corresponding data in the database;

when data is entered into the database associated with the given markup language element in the document, automatically writing the data to the document in a location in the document associated with the given markup language element;

when the given markup language element in the document is modified, automatically updating the corresponding data in the database;

providing at least one suggested document element according to the schema file associated with the at least one intended use of the document, wherein the at least one suggested document element comprises an element structure linked to at least one corresponding data field in the database; and enforcing at least one element constraint according to the schema file, wherein the element constraint comprises at least one piece of required data for at least one document element.

2. The method of claim 1, further comprising:

writing a database query to the database for assembling data from at least one data field within the database; and writing the results of the database query into the document in a location in the document associated with the database query.

3. The method of claim 2, further comprising associating the database query with a given markup language element in the document for writing the results of the database query into the document in a location in the document associated with the database query.

4. The method of claim 3, further comprising storing a programming procedure in the database for reading the data from the database and for writing the data to the document in a location in the document associated with the given markup language element.

5. The method of claim 4, further comprising:

updating the results of the database query when data in the database associated with the database query is updated; and executing the programming procedure when results of the database query are updated.

6. The method of claim 5, wherein the procedure is in the format "GetCurrentMarkupElementData."

7. The method of claim 2, further comprising:

writing a database query to the database for writing data entered into the document to a data field in the database linked to the given markup language element.

8. The method of claim 7, further comprising associating the database query with a given markup language element in the document for writing data entered into the document to a data field in the database linked to the given markup language element.

9. The method of claim 8, further comprising storing a programming procedure in the database for writing the data entered into the document to a data field in the database linked to the given markup language element as required by the query.

10. The method of claim 9, wherein the procedure is in the format "SetCurrentMarkupElementData."

11. The method of claim 1, wherein the markup language is the Extendable Markup Language.

12. The method of claim 1, wherein the markup language is the Hypertext Markup Language.

13. The method of claim 1, wherein linking at least one markup language element in the document to corresponding data fields in the database further comprises:

providing a list of markup language elements contained in the document;

providing a list of data fields established for linking to corresponding markup language elements in the document;

selecting a markup language element from the list of markup language elements;

selecting a data field from the list of data fields for linking the selected data field to the selected markup language element; and upon selection of the data field from the list of data fields for linking the selected data field to the selected markup language element, linking the selected data field to the selected markup language element.

14. A method of linking elements in a computer-generated document to corresponding data in a database, comprising:

attaching a schema file associated with at least one intended use of the document to a document defining rules associated with a markup language to be applied to the document, wherein the markup language is XML and wherein the rules associated with the markup language to be applied to the document comprise names of elements of the markup language and data types associated with the names of the elements of the markup language applying the elements of the markup language to the document;

determining if a table associated with the document exists within a document library;

if no table is associated with the document, creating a table containing user-defined elements associated with the document;

linking at least one markup language element in the document to corresponding data in the database, wherein linking the data fields in the database to the document comprises selecting the created table within a document library, the document library being maintained in the database where the table is associated with the document;

writing a unique document identifier number to the document for linking the at least one markup language element in the document to corresponding data in the database;

entering data into the database associated with a given markup language element in the document;

in response to entering data into the database associated with the given markup language element in the document, automatically writing the data to the document in a location in the document associated with the given markup language element;

entering data into the document associated with a given markup language element;

in response to entering data into the document associated with the given markup language element, automatically writing the data entered into the document to a data field in the database linked to the given markup language element;

providing at least one suggested document element according to the schema file associated with the at least one intended use of the document, wherein the at least one suggested document element comprises an element structure linked to at least one corresponding data field in the database; and enforcing at least one element constraint according to the schema file associated with the document type, wherein the element constraint comprises at least one piece of required data for at least one document element.

15. The method of claim 14, further comprising establishing data fields within the database for linking to corresponding markup language elements in the document.

16. The method of claim 15, further comprising:

writing a first database query to the database for assembling data from at least one data field within the database and for writing the results of the first database query into the document in a location in the document associated with the first database query;

writing a second database query to the database for writing data entered into the document to a data field in the database linked to the given markup language element.

17. The method of claim 16, further comprising associating the first and second database queries with a given markup language element in the document.

18. The method of claim 17, further comprising storing a first programming procedure in the database for reading the data from the database and for writing the data to the document in a location in the document associated with the given markup language element.

19. The method of claim 18, further comprising:

updating the results of the first database query when data in the database associated with the first database query is updated; and executing the first programming procedure when results of the first database query are updated.

20. The method of claim 19, further comprising storing a second programming procedure in the database for writing the data entered into the document to a data field in the database linked to the given markup language element as required by the second database query.

21. The method of claim 20, wherein the markup language is the Extendable Markup Language.

22. The method of claim 20, wherein the markup language is the Hypertext Markup Language.

23. The method of claim 14, wherein linking at least one markup language element in the document to corresponding data fields in the database further comprises:

providing a list of markup language elements contained in the document;

providing a list of data fields established for linking to corresponding markup language elements in the document;

selecting a markup language element from the list of markup language elements;

selecting a data field from the list of data fields for linking the selected data field to the selected markup language element; and upon selection of the data field from the list of data fields for linking the selected data field to the selected markup language element, linking the selected data field to the selected markup language element.

24. A computer readable storage medium having stored thereon computer-executable instructions which when executed by a computer, perform:

attaching a schema file associated with a document type to a document defining rules associated with a markup language to be applied to the document, wherein the markup language is XML and wherein the rules associated with the markup language to be applied to the document comprise names of elements of the markup language and data types associated with the names of the elements of the markup language linking at least one XML element in the document to corresponding data fields in a database, wherein linking the data fields in the database to the document comprises selecting a table within a document library, the document library being maintained in the database where the table is associated with the document;

determining if a table associated with the document exists within a document library;

if no table is associated with the document, creating a table containing user-defined elements associated with the document;

entering data into the created table in the database associated with a given XML element; and when data is entered into the database associated with the given XML element, automatically saving the data to a data field in the database corresponding to the given XML element;

when the given XML element in the document is modified, automatically updating the corresponding data in the database;

providing at least one suggested document element according to the schema file associated with the at least one intended use of the document, wherein the at least one suggested document element comprises an element structure linked to at least one corresponding data field in the database; and enforcing at least one element constraint according to the schema file associated with the document type, wherein the element constraint comprises at least one piece of required data for at least one document element.

25. The computer readable medium of claim 24, prior to linking at least one XML element in the document to corresponding data fields in the database, selecting the document from a document library containing documents annotated with the at least one XML element and the document associated with the database, the data base containing data fields established for linking to the at least one XML element.

26. The computer readable medium of claim 25, wherein linking at least one XML element in the document to corresponding data fields in the database further comprises:

providing a list of XML elements contained in the document;

providing a list of data fields established for linking to corresponding XML elements in the document;

selecting an XML element from the list of XML elements;

selecting a data field from the list of data fields for linking the selected data field to the selected XML element; and upon selection of the data field from the list of data fields for linking the selected data field to the selected XML element, linking the selected data field to the selected XML element.

27. The computer readable medium of claim 26, wherein linking at least one XML element in the document to corresponding data fields in the database includes writing a unique document identifier to the document and associating the unique document identifier with the selected XML element and associating the unique document identifier with the selected data field to point the selected XML element to the selected data field in the database.

28. A computer-readable medium which stores a set of instructions which when executed performs a method for linking elements in a computer-generated document to corresponding data in a database, the method executed by the set of instructions comprising:

attaching a schema file associated with at least one intended use of the document, wherein the at least one intended use comprises a user-selected intended use from a plurality of available intended uses, to a document defining rules associated with a markup language to be applied to the document, wherein the markup language is XML and wherein the rules associated with the markup language to be applied to the document comprise names of elements of the markup language and data types associated with the names of the elements of the markup language;

linking at least one XML element in the document to corresponding data fields in a database, wherein linking the data fields in the database to the document comprises selecting a table within a document library, the document library being maintained in the database where the table is associated with the document;

determining if a table associated with the document exists within a document library;

if no table is associated with the document, creating a table containing user-defined elements associated with the document;

writing a unique document identifier number to the document for linking the at least one markup language element in the document to corresponding data in the database;

entering data into the document associated with a given XML element;

in response to entering data into the document associated with the given XML element, automatically saving the data to a data field in the database corresponding to the given XML element;

entering data into the database associated with a given XML element;

in response to entering data into the database associated with the given XML element, automatically saving the data to a data field in the database corresponding to the given XML element;

providing at least one suggested document element according to the schema file associated with the at least one intended use of the document, wherein the at least one suggested document element comprises an element structure linked to at least one corresponding data field in the database; and enforcing at least one element constraint according to the schema file associated with the document type, wherein the element constraint comprises at least one piece of required data for at least one document element.

* * * * *